US007930067B2

(12) United States Patent
Miyamoto et al.

(10) Patent No.: US 7,930,067 B2
(45) Date of Patent: Apr. 19, 2011

(54) MOTION EDITING APPARATUS AND MOTION EDITING METHOD FOR ROBOT, COMPUTER PROGRAM AND ROBOT APPARATUS

(75) Inventors: Atsushi Miyamoto, Kanagawa (JP); Tomohisa Moridaira, Tokyo (JP)

(73) Assignee: Sony Corporation, Tokyo (JP)

( * ) Notice: Subject to any disclaimer, the term of this patent is extended or adjusted under 35 U.S.C. 154(b) by 1328 days.

(21) Appl. No.: 11/480,126

(22) Filed: Jun. 30, 2006

(65) Prior Publication Data

US 2007/0010913 A1    Jan. 11, 2007

(30) Foreign Application Priority Data

Jul. 5, 2005    (JP) .................................. 2005-196886

(51) Int. Cl.
*G05B 19/19*    (2006.01)
*G05B 15/00*    (2006.01)
*B25J 9/22*    (2006.01)
(52) U.S. Cl. ... 700/264; 700/182; 700/246; 318/568.13; 901/3; 901/50
(58) Field of Classification Search .................. 700/182, 700/180, 245, 246, 264, 261; 715/707, 764, 715/848, 863; 318/568.1, 568.11, 568.13, 318/568.14, 568.15, 568.19, 568.25, 568.16; 901/3, 5, 50; 345/158, 643; 703/7, 13
See application file for complete search history.

(56) References Cited

U.S. PATENT DOCUMENTS

| 5,581,672 | A  | * | 12/1996 | Letcher, Jr. .................... 345/420 |
| 6,088,628 | A  | * | 7/2000  | Watanabe et al. ............. 700/264 |
| 6,167,328 | A  | * | 12/2000 | Takaoka et al. ............... 700/264 |
| 6,243,096 | B1 | * | 6/2001  | Takanashi ...................... 345/419 |
| 6,535,787 | B1 | * | 3/2003  | Inamasu et al. ............... 700/180 |
| 7,403,835 | B2 | * | 7/2008  | Sandner et al. ............... 700/253 |
| 2002/0095236 | A1 | * | 7/2002 | Dundorf ....................... 700/182 |

FOREIGN PATENT DOCUMENTS

| JP | 8 118263   | 5/1996 |
| JP | 2003 275473 | 9/2003 |

* cited by examiner

*Primary Examiner* — Thomas G Black
*Assistant Examiner* — Christine Behncke
(74) *Attorney, Agent, or Firm* — Frommer Lawrence & Haug LLP; William S. Frommer

(57) ABSTRACT

An apparatus and method is disclosed wherein motion data which define motions of an end effecter of a robot such as a hand tip can be produced simply and conveniently. The apparatus and method provide a motion editing environment in which motion data for allowing a robot to plot a picture or a character can be edited simply and conveniently based on interactions such as hand-written inputting of a user through a mouse, a tablet or the like. By reproducing the produced motion data on a robot, a motion of plotting an arbitrary character or picture by the robot can be implemented simply.

26 Claims, 10 Drawing Sheets

FIG.6
X AXIS
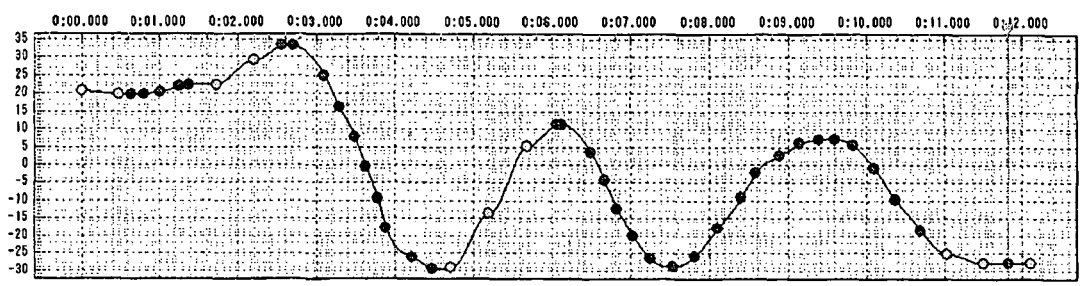
Y AXIS
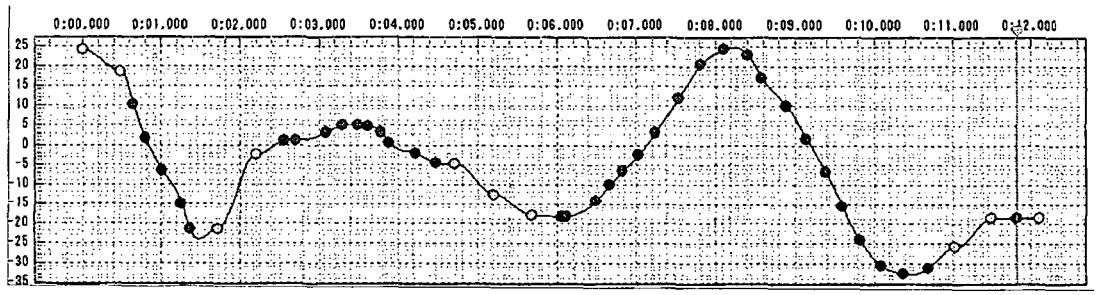
Z AXIS
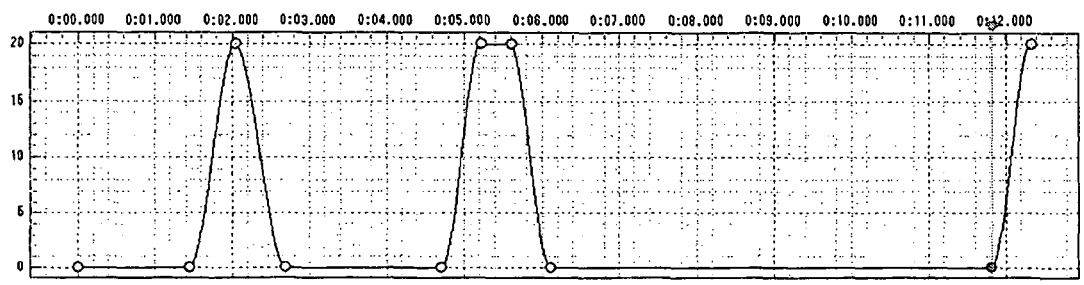

F I G . 9
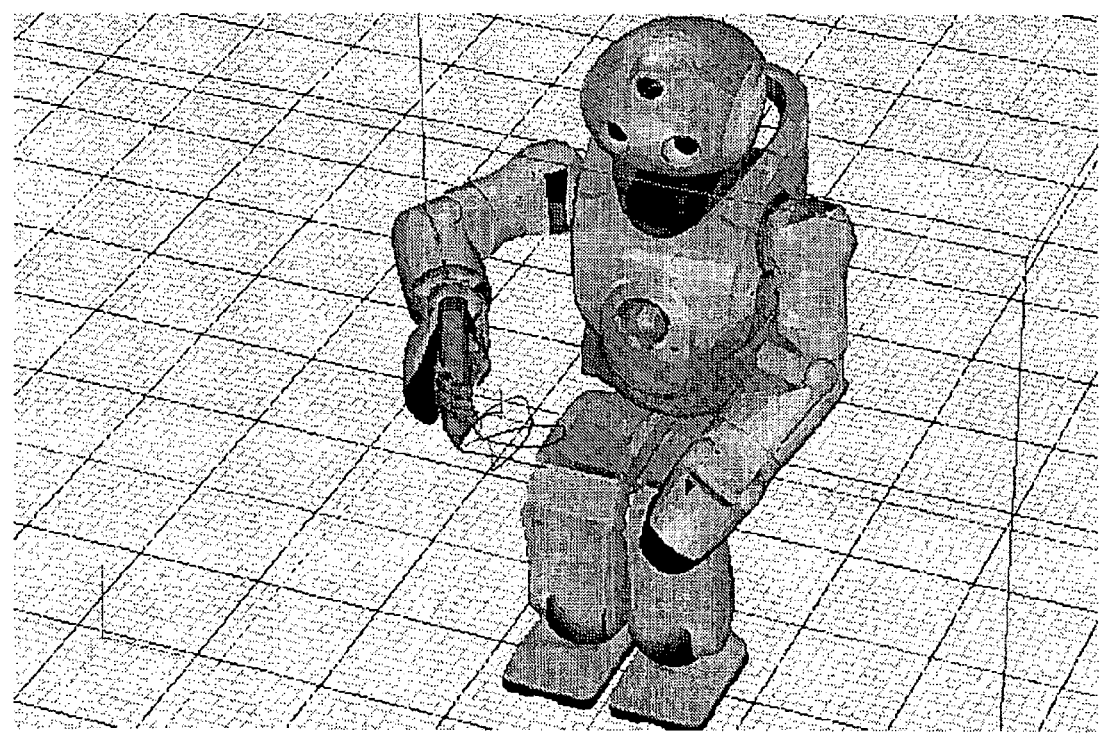

MOTION EDITING APPARATUS AND MOTION EDITING METHOD FOR ROBOT, COMPUTER PROGRAM AND ROBOT APPARATUS

CROSS REFERENCES TO RELATED APPLICATIONS

The embodiment of the present invention contains subject matter related to Japanese Patent Application JP 2005-196886 filed with the Japanese Patent Office on Jul. 5, 2005, the entire contents of which being incorporated herein by reference.

BACKGROUND OF THE INVENTION

1. Field of the Invention

This invention relates to a motion editing apparatus and a motion editing method as well as a computer program wherein motion data which define motions of a robot having a plurality of degrees of joint freedom are edited and a robot apparatus which reproduces edited motion data. More particularly, the present invention relates to a motion editing apparatus and a motion editing method as well as a computer program for a robot wherein motion data which define a motion of an end effecter such as hand tips which can provide an operation for a particular operation object are edited and a robot apparatus which reproduces a motion of a movable member in accordance with edited motion data.

More specifically, the present invention relates to a motion editing apparatus and a motion editing method as well as a computer program wherein motion data for causing a robot to plot a picture or a character using a pen provided on hand tips are edited and a robot apparatus which reproduces a motion of plotting a hand-written inputted picture or character in accordance with edited motion data. The present invention more particularly relates to a motion editing apparatus and a motion editing method as well as a computer program wherein motion data for causing a robot to plot a picture or a character based on a hand-written input of a user from a mouse or a tablet are edited and a robot apparatus which reproduces a motion of plotting a hand-written inputted picture or character in accordance with edited motion data.

2. Description of the Related Art

Research and development regarding the structure or stabilized walking control of a legged mobile robot has been and is proceeded recently and also the expectation for practical use of a legged mobile robot is increasing. The legged mobile robot is less stable and more difficult in posture control and walking control than a crawler type robot. However, the legged mobile robot is superior in that flexible walking or running motion such as an ascending or descending motion on a staircase or getting over of an obstacle can be implemented.

A conventional robot is applied principally to substitutive execution or supporting of various human works in industrial activities or production activities as represented by a 6-axis manipulator. The robot in this instance presupposes that it acts in a structured environment such as a factory, and hence does not basically perform complicated physical interactions with a human being or an environment.

In contrast, attention is paid to an application of a robot as an application of the partner type, that is, an application to "symbiosis" with a human being or to "entertainment". It is desirable for a robot of the type described to have a high interaction capacity in interaction not only with an environment or an object but also with a human being. A robot of the partner type is not fixed at a predetermined place like a 6-axis manipulator but is normally formed as a mobile robot which autonomously moves to provide various services. A representative one of such partner type robots is a humanoid.

A partner type robot has a high information processing capacity, and the robot itself can be grasped as a kind of computer system. In other words, an advanced and complicated motion sequence formed from a combination of motion patterns implemented on a robot or of a plurality of basic motion patterns, that is, "motion data" of a robot, are produced and edited by work similar to that in computer programming.

In order for a robot body to be spread widely, various motion data for implementing motions of the robot body can preferably be utilized freely. Further, it is estimated that, in the future, a robot spreads itself deeply not only into the industrial world but also into everyday life in general households. Above all, as regards products which pursue entertaining effects, it is demanded strongly that a choreographer, a designer, a user in general or the like can produce motion data simply and readily even if it is not acquainted with a high-level knowledge of computer programming or motion control of a robot.

Therefore, the inventors of the present invention believe that it is desirable to construct a development environment wherein motion editing for a robot can be performed comparatively readily and efficiently by interactive processing, that is, a motion editing system.

A robot such as, for example, a humanoid can perform various physical interactions with the external world such that it not only uses movable legs to walk round freely but also perform an operation for a particular operation object. Further, such a robot as just described can use end effecters such as hand tips to implement motions having high entertaining effects such as to play a musical instrument or to plot a picture or a character to amuse the user.

In the robot industry, a method of designing a trajectory of each operation member of a robot beginning with a hand tip and determining a motion of each joint of a robot arm using inverse kinematics (inverse kinematical arithmetic operation) from the designed trajectory is known well. However, a motion of gripping a pen with hand tips and plotting an arbitrary picture or character is complicated, and it is not easy to edit motion data for the motion. A motion of the type described does not being achieved sufficiently only if a trajectory of a pen point on a canvas is designed, and it is necessary to design motions with regard to whether the pen point during movement contacts with the canvas or is spaced from the canvas or what writing pressure is applied for plotting.

For example, a wall surface painting robot system has been proposed and is disclosed in Japanese Patent Laid-Open No. Hei 8-118263 (hereinafter referred to as Patent Document 1). The wall surface paining robot system of Patent Document 1 includes a robot main body which attracts and moves on a wall surface, an arm attached to the robot main body, a painting gun movable along the arm, and a painting control device for inputting a picture pattern to be painted. The robot main body is moved upwardly and downwardly and further moved in a horizontal direction on a painting surface under the control of the painting control device. During such movement, paint is sprayed at a fixed pitch to the wall surface to paint a picture pattern.

Meanwhile, a plotting robot is disclosed in Japanese Patent Laid-Open No. 2003-275473 (hereinafter referred to as Patent Document 2) wherein plotting operation data are produced from image data obtained by image pickup by using a camera and a plotting medium provided at an end of an arm is used to plot on a plotting medium.

However, the systems disclosed in Patent Document 1 and Patent Document 2 suggest nothing of motion designing for causing a robot to perform plotting and have nothing to do with simplification of editing work of motion data for plotting an arbitrary picture or character.

SUMMARY OF THE INVENTION

It is desirable to provide a superior motion editing apparatus and motion editing method as well as computer program wherein motion data which define motions of a robot at end effecters such as hand tips and can provide an operation to a particular operation object can be edited by a simple and easy method as well as a robot apparatus which can reproduce a motion of a movable member in accordance with edited motion data.

Further, it is desirable to provide a superior motion editing apparatus and motion editing method as well as computer program wherein motion data for causing a robot to plot a picture or a character using a pen provided at hand tips can be edited by a simple and easy method as well as a robot apparatus which can reproduce a motion of plotting a picture or a character in accordance with edited motion data.

Furthermore, it is desirable to provide a superior motion editing apparatus and motion editing method as well as computer program wherein motion data for causing a robot to plot a picture or a character can be edited simply and readily based on a hand-written input of a user through a mouse, a tablet or the like as well as a robot apparatus which can reproduce a motion of plotting a picture or a character hand-written inputted in accordance with edited motion data.

According to an embodiment of the present invention, there is provided a motion editing apparatus for editing motion data which define motions of a robot apparatus which includes an operation member having a plurality of movable joints and capable of providing an operation to a particular operation object, including a hand-written inputting section configured to allow a user to hand-written input a character or a picture to be plotted by the robot apparatus, a plotting trajectory discrimination section configured to discriminate, from within the trajectory plotted through the hand-written inputting section, a first portion which is being plotted and a second portion other than the first portion, a hand-written input information display section configured to output the trajectory being hand-written inputted by the user on a screen, a three-dimensional trajectory design deriving section configured to derive a three-dimensional trajectory design based on the two-dimensional plotting information inputted through the hand-written inputting section and a result of the discrimination by the plotting trajectory discrimination section, a three-dimensional trajectory design display section configured to display the three-dimensional trajectory design derived by the three-dimensional trajectory design deriving section on a three-dimensional screen, an interaction section configured to re-arrange the three-dimensional trajectory design in a three-dimensional space, in which the robot apparatus works, in accordance with interactions of the user through the three-dimensional screen and designate an operation member by which plotting of a character or a picture is to be performed in accordance with the three-dimensional trajectory design, an instruction value conversion section configured to convert the re-arranged three-dimensional trajectory design into instruction values for joint actuators, which compose a designated operation member, for plotting using the designated operation member, and a motion data outputting section configured to output the converted instruction values as motion data which define the three-dimensional trajectory design in accordance with which the robot apparatus implements the character or the picture hand-written inputted by the user in the three-dimensional space.

The embodiment of the present invention provides a motion editing apparatus for editing motion data which define motions of a robot having a plurality of degrees of joint freedom. The motion editing apparatus according to the embodiment of the present invention provides an editing environment in which motion data particularly regarding a partner type robot represented by a humanoid can be produced simply and conveniently through interactions.

The partner type robot includes moving members such as movable legs and can autonomously move to provide various services to a user. Further, the partner type robot can perform various physical interactions with the external world such as to provide an operation to a particular operation object.

However, it is not easy to edit motion data for plotting a picture or a character using an end effecter such as a hand tip. A motion of the type mentioned does not being achieved sufficiently by merely designing the trajectory of a pen point on a canvas, and it is necessary to design a motion with regard to whether the pen point during movement remains in contact with or is spaced from the canvas or under what writing pressure the pen point plots.

Therefore, the motion editing apparatus according to the embodiment of the present invention provides a motion editing environment in which motion data for allowing a robot to plot a picture or a character can be edited simply and conveniently based on interactions such as hand-written inputting of a user through a mouse or a tablet. Accordingly, it is possible to implement a motion of plotting an arbitrary character or picture by a robot simply if the produced motion data are reproduced on the robot.

In particular, when the user hand-written inputs a character or a picture to be plotted by a robot, a first portion of a plotted trajectory which is being plotted and a second portion of the trajectory other than the first portion are discriminated from each other. Then, a three-dimensional trajectory design is derived based on two-dimensional plotting information and a result of the discrimination of the plotted trajectory. Thereafter, the derived three-dimensional trajectory design is displayed on a three-dimensional screen. Then, the three-dimensional trajectory design is re-arranged in a three-dimensional space, in which the robot works, in accordance with interactions of the user through the three-dimensional screen, and an operation member with which plotting of the character or picture is to be performed is designated in accordance with the three-dimensional trajectory design. Then, in order to plot the re-arranged three-dimensional trajectory design using the designated operation member, the re-arranged three-dimensional trajectory design is converted into instruction values for joint actuators which form the operation member using inverse kinematics arithmetic operation or the like. Consequently, motion data which define the three-dimensional trajectory design for implementing the character or picture hand-written inputted by the user in the three-dimensional space by the robot can be obtained.

Where the hand-written inputting section includes a mouse, the plotting trajectory discrimination section may discriminate that the trajectory within a period of time within which a mouse button is operated on is the first portion which is being plotted and the trajectory within another period of time within which the mouse button is not operated on is the second portion other than the first portion.

On the other hand, where the hand-written inputting section includes a tablet with a writing pressure detection function, the plotting trajectory discrimination section may discriminate that the trajectory within a period within which the writing pressure is higher than a predetermined value is the first portion which is being plotted and the trajectory within another period within which the writing pressure is equal to or lower than the predetermined value is the second portion other than the first portion.

The hand-written input information display section may display the first portion of the trajectory which is being plotted by a solid line and display the second portion of the trajectory other than the first portion by a line any other than the solid line. With the motion editing apparatus, since the trajectory of plotting remains on the screen, the user can confirm the substance being plotted by the user itself at any time.

The three-dimensional trajectory design deriving section may determine time series coordinate information on a two-dimensional xy plane in the three-dimensional trajectory design based on time series information of two-dimensional xy coordinates inputted from the hand-written inputting section and give a z-axis coordinate value in the three-dimensional trajectory design depending upon whether or not the point on the two-dimensional plane corresponds to a point which is being plotted. With the motion editing apparatus, a three-dimensional trajectory design for allowing the robot to plot a character or a picture can be obtained. Further, when hand-written inputted two-dimensional xy coordinates are mapped on a two-dimensional xy plane in the three-dimensional trajectory design for a robot, scale conversion from a unit of a pixel into a scale of meter is performed.

The motion editing apparatus may be configured such that the three-dimensional trajectory design deriving section derives a force control parameter to be used for force control when the robot apparatus is to plot a character or a picture through an inputting operation of the hand-writing inputting section by the user, and the motion data outputting section outputs the motion data with the force control parameter.

Where a force control parameter is described additionally in the motion data in this manner, the robot which reproduces the motion data can perform, during a motion of plotting a character or a picture, the plotting motion with the writing pressure taken into consideration based on the force control parameter. Or, since the robot apparatus which reproduces the motion data performs a plotting motion of a picture or a character while it performs the force control in accordance with the force control parameter, the robot apparatus can be applied readily also to an object which moves or changes its shape while plotting is proceeding.

In this instance, the three-dimensional trajectory design deriving section may determine the force control parameter based on a z-axis coordinate value in the three-dimensional trajectory design which is given depending upon whether or not plotting is proceeding.

Where the hand-written inputting section includes a tablet with a plotting pressure detection function, the three-dimensional trajectory design deriving section may determine the force control parameter based on the writing pressure when the user plots a character or a picture on the tablet.

The three-dimensional trajectory design deriving section may determine, as the force control parameter, a target force in a z-axis direction to be applied to an xy plane as a plotting surface.

The three-dimensional trajectory design deriving section may determine, as the force control parameter, an application rate α representative of a ratio of target position posture information determined with the force control taken into consideration to a target position posture defined by the motion data. For example, if the application rate α is raised, then target position posture control in which the force control is taken into consideration is performed, and therefore, the application rate α is preferably set to a comparatively high value at a solid line portion of the trajectory which is plotted by the pen point. On the other hand, if the application rate α is set to a low value, then since importance is attached to a target position posture defined by the motion data, within a period within which the pen is moved in a spaced relationship from the plotting surface, the application rate α is preferably set to a comparatively low value so that plotting of a trajectory as given by the motion data is executed in fidelity.

The motion editing apparatus may further include a screen reproduction section configured to reproduce a manner in which the robot apparatus plots a character or a picture in accordance with the trajectory design of the instruction values converted by the instruction value conversion section on the three-dimensional screen. With the motion editing apparatus, the user can observe the screen to confirm a manner in which the character or picture hand-written inputted by the user itself is plotted in the three-dimensional space by the robot.

The motion editing apparatus may further include a physical restriction confirmation section configured to confirm, when a character or a picture is plotted in accordance with the three-dimensional trajectory re-arranged in the three-dimensional space, whether or not a physical restriction to the robot apparatus or an arm of the robot apparatus is contrary. With the motion editing apparatus, if it is found that some physical restriction is contrary, then the motion editing apparatus can present the detailed substance of the physical restriction to urge the user to execute re-editing.

According to a further embodiment of the present invention, there is provided a computer program described in a computer-readable form so that a computer system executes a process of editing motion data which define motions of a robot apparatus which includes an operation member having a plurality of movable joints and capable of providing an operation to a particular operation object, the computer program causing the computer system to execute a hand-written inputting step of inputting a character or a picture hand-written inputted by a user, a plotting trajectory discrimination step of discriminating, from within the trajectory plotted at the hand-written inputting step, a first portion which is being plotted and a second portion other than the first portion, a hand-written input information display step of outputting the trajectory being hand-written inputted by the user on a screen, a three-dimensional trajectory design deriving step of deriving a three-dimensional trajectory design based on the two-dimensional plotting information inputted at the hand-written inputting step and a result of the discrimination at the plotting trajectory discrimination step, a three-dimensional trajectory design display step of displaying the three-dimensional trajectory design derived at the three-dimensional trajectory design deriving step on a three-dimensional screen, an interaction step of re-arranging the three-dimensional trajectory design in a three-dimensional space, in which the robot apparatus works, in accordance with interactions of the user through the three-dimensional screen and designate an operation member by which plotting of a character or a picture is to be performed in accordance with the three-dimensional trajectory design, an instruction value conversion step of converting the re-arranged three-dimensional trajectory design into instruction values for joint actuators, which compose a designated operation member, for plotting using the designated operation member, and a motion data outputting step of outputting the converted instruction values as motion data which define the three-dimensional trajectory design in accordance with which the robot apparatus implements the character or the picture hand-written inputted by the user in the three-dimensional space.

The computer program is described in a computer-readable form so as to implement a predetermined process on a computer system and implements the motion editing method described above. In other words, if the computer program is installed into a computer system, then cooperative action is exhibited on the computer system, and similar action and effects to those of the motion editing apparatus described above can be achieved.

The motion data edited on the motion editing apparatus according to the embodiment of the present invention have a data structure wherein, to time series data of joint angles for producing a trajectory of an operation member for plotting a character or a picture such as a robot arm, a force control parameter for applying the force control, that is, virtual compliance control, is added. According to a still further embodiment of the present invention, such motion data are reproduced to implement plotting of a character or a picture by a robot apparatus including, the motion data defining a time series of position postures regarding the operation member, the motion data including at least a target force to be applied to the operation object from the operation member as a force control parameter, a detection section configured to detect current joint angles and an external force applied to the operation member, a current position posture calculation section configured to calculate a current position posture of the operation member based on the current joint angles, a target position posture calculation section configured to calculate a target position posture of the operation member at a next point of time in accordance with the motion data, a force control section configured to perform force control regarding the operation member using a force obtained based on the target force given as the force control parameter and the external force detected by the detection section and calculate a target position posture of the operation member based on the force control, a target position posture determination section configured to determine a final target position posture regarding the operation member based on the target position posture determined from the motion data by the target position posture calculation section and the target position posture determined by the force control section with the force control taken into consideration, an instruction value conversion section configured to covert the final target position posture regarding the operation member into instruction values for joint actuators which form the operation member, and a driving control section configured to drive the joint actuators in accordance with the converted instruction values.

The robot apparatus may be configured such that the motion data include, as the force control parameter, an adaptation rate representative of a ratio of the target position posture determined by the force control section with the force control taken into consideration to the target position posture determined from the motion data by the target position posture calculation section, and the target position posture determination section determines a final target position posture regarding the operation member based on the adaptation rate. In such an instance as just described, the target position posture determination section may determine a final target position posture regarding the operation member based on the adaptation rate. For example, when the adaptation rate $\alpha$ is comparatively high, the target position posture control with the force control taken into consideration is performed. On the other hand, when the adaptation rate $\alpha$ is comparatively low, the target position posture control defined by the motion data is performed.

Further, in a motion design application for a robot, reference coordinates for position instructions to individual members can be set arbitrarily. For example, where the robot includes a plurality of operation members like the right hand and the left hand, when one of the operation members is used to provide an operation to the operation object, it is possible to use the other operation member to acquire current position posture information regarding the operation object and set reference coordinates of a higher degree of accuracy for providing an operation to the operation object.

In particular, where the robot apparatus includes a second operation member capable of supporting the operation object in addition to the first operation member which provides an operation to the operation object further includes an operation object supporting section configured to cause the second operation member to support the operation object under the force control, and second current position posture calculation section configured to calculate a current position posture of the second operation member based on joint angles of the second operation member on which the operation object is supported. In such an instance, even where the position posture of the operation object is not robust, the target position posture calculation section can calculate, based on the current position posture of the second operation member, a trajectory of a position posture in which the first operation member provides an operation to the operation object in accordance with the motion data with a higher degree of accuracy. Then, the target position posture determination section determines a final target position posture regarding the first operation member based on a target position posture determined from the motion data based on the current position posture of the second operation member and a target position posture determined by the force control section with the force control taken into consideration. Thereafter, the instruction value conversion section converts the final target position posture regarding the first operation member into instruction values for the joint actuators which form the first operation member.

For example, the left hand of the robot is used to support the plotting surface of a canvas or the like which is disposed at an arbitrary place in the air through the force control or the like to acquire current position posture information regarding the plotting surface and set reference coordinates of a higher degree of accuracy to be used upon plotting. Then, a trajectory of a higher degree of accuracy of a target position posture of a hand tip of the right hand, in which a pen is held, is calculated based on the reference coordinate system. In particular, the local coordinates of the hand tip of the left hand are taken as an origin, and a relative position instruction of the hand tip of the right hand with respect to the origin is discharged as motion data. Thus, the data can be utilized effectively on the actual machine side to implement a robust plotting function.

According to the embodiment of the present invention, a superior motion editing apparatus and motion editing method as well as computer program by which motion data which define motions of an end effecter of a robot such as a hand tip which can provide an operation to a particular operation object and a robot apparatus which can reproduce a motion of a movable member in accordance with edited motion data can be provided.

Further, according to the embodiment of the present invention, a superior motion editing apparatus and motion editing method as well as computer program by which motion data for causing a robot to plot a picture or a character using a pen provided at a hand tip of the robot can be edited simply and conveniently and a robot apparatus which can reproduce a motion of plotting a picture or a character in accordance with edited motion data can be provided.

With the motion editing apparatus according to the embodiment of the present invention, motion data for allowing a robot to plot a picture or a character can be edited simply and conveniently based on a hand-written input of a user, for example, through a mouse or a tablet. Accordingly, if the produced motion data are reproduced on a robot, then a motion of plotting an arbitrary character or picture by the robot can be implemented simply.

Further, with the motion editing apparatus according to the embodiment of the present invention, when the user hand-written inputs a character or a picture through a mouse or a table, a parameter to be used for the force control of a pressure to be applied to the pen point or the like can be acquired and described in addition to the motion data. In this instance, a robot which reproduces the motion data can perform, during a motion of plotting a character or a picture, the plotting motion with the writing pressure taken into consideration based on the force control parameter.

Further, with the motion editing apparatus according to the embodiment of the present invention, a physical restriction to a robot can be confirmed during a work while trajectories of tip ends and the whole body when a picture or a character is to be plotted are designed. Therefore, there is no possibility that such motion data which causes a robot to execute an incomprehensible motion may be produced.

Further, with the motion editing apparatus according to the embodiment of the present invention, if changing a process of deriving a three-dimensional trajectory from hand-written input information of a user through a mouse or a tablet, then motion data to be used not only for plotting on a two-dimensional object such as a paper sheet or a wall but also for plotting on the surface of a three-dimensional object such as a glass or a ball can be produced readily.

Furthermore, with the motion editing apparatus according to the embodiment of the present invention, a force control parameter which is obtained when a user hand-written inputs a picture or a character through a mouse or a tablet can be added to the motion data. Accordingly, since a robot apparatus which reproduces the motion data performs a plotting motion of a character or a picture while it performs the force control in accordance with the force control parameter, the robot apparatus can be applied readily also to an object which moves or changes its shape while plotting is proceeding.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a chart wherein plotting information on the xyz axes when two-dimensional plotting information plotted by the operation of the mouse is converted into a three-dimensional plotting trajectory is represented where the axis of abscissa represents the time;

FIG. 9 is a schematic view showing an example of a configuration of a screen where a manner in which a robot operates along a trajectory design of converted instruction values is reproduced on a three-dimensional screen;

DETAILED DESCRIPTION OF THE PREFERRED EMBODIMENT

Figure 1:
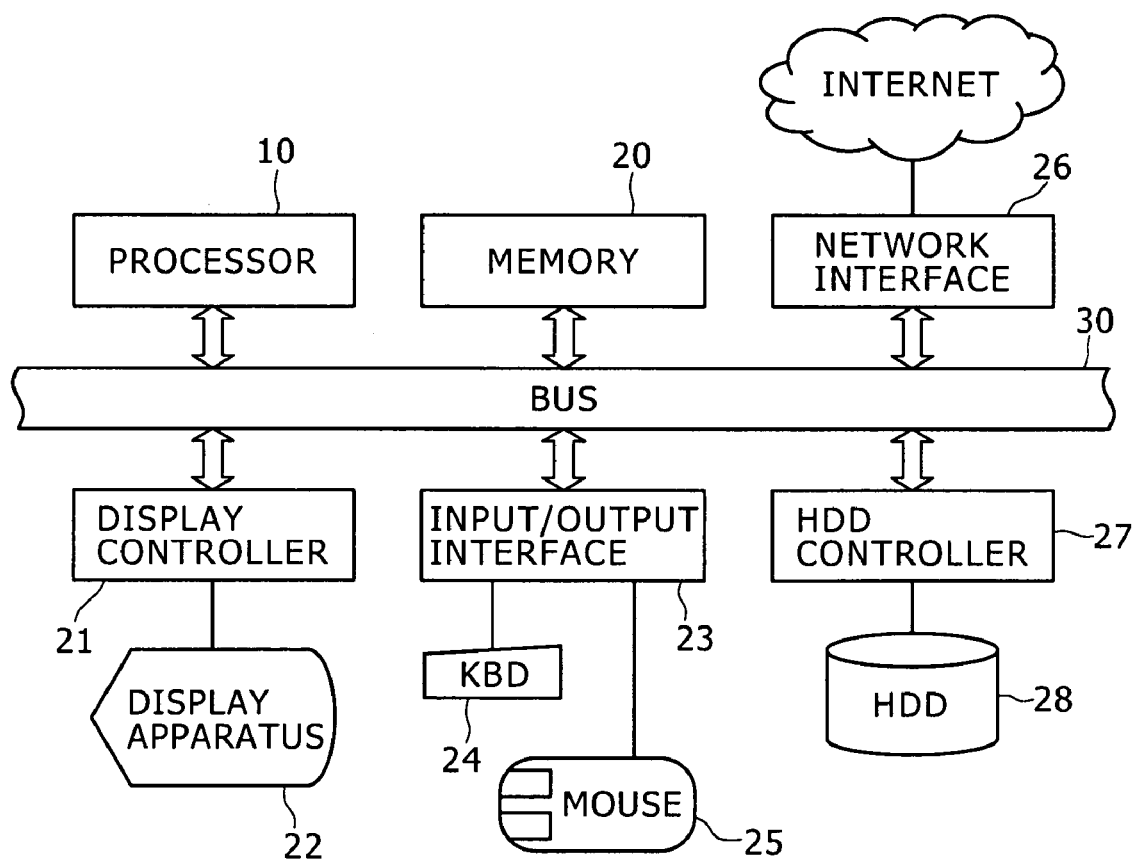
FIG. 1 is a block diagram schematically showing a hardware configuration of a motion editing apparatus to which the embodiment of the present invention is applied.

The present invention relates to a motion editing apparatus for editing motion data which define motions of a robot which has a plurality of degrees of joint freedom. While editing of motion data for a robot is work similar to computer programming, a motion editing apparatus according to a preferred embodiment of the present invention provides an editing environment wherein even a user who is not acquainted with a high-level knowledge of computer programming or motion control of a robot can produce motion data simply and readily.

The robot here is, for example, a robot of the partner type which has a high interaction capacity in interaction not only with an environment or an object but also with a human being. A representative one of robots of the partner type is a humanoid, which includes measures for movement such as movable legs and can autonomously move to provide various services to the user.

A robot such as, for example, a humanoid can perform various physical interactions with the external world such that it not only uses movable legs to walk round freely but also perform an operation for a particular operation object. Further, such a robot as just described can use end effecters such as hand tips to implement motions having high entertaining effects such as to play a musical instrument or to plot a picture or a character to amuse the user.

Here, a motion of gripping a pen with hand tips and plotting an arbitrary picture or character is complicated, and it is not easy to edit motion data for the motion. A motion of the type described cannot be achieved sufficiently only if a trajectory of a pen point on a canvas is designed, and it is necessary to design motions with regard to whether the pen point during movement contacts with the canvas or is spaced from the canvas or what writing pressure is applied for plotting.

Thus, the motion editing apparatus according to the embodiment of the present invention provides a motion editing environment wherein motion data for allowing a robot to plot a picture or a character can be edited simply and readily based on interactions such as hand-writing inputting of a user through a mouse, a tablet or the like. Accordingly, if the produced motion data are reproduced on a robot, then the robot can simply implement a motion of plotting an arbitrary character or picture.

Further, the motion editing apparatus according to the embodiment of the present invention can acquire, when the user uses a mouse or tablet to hand-written input a character or a picture, parameters for use for control such as a pressure to be applied to the pen point and describe the parameters additionally in motion data. In this instance, a robot which reproduces the motion data can actually carry out a plotting motion with a writing pressure taken into consideration based on force control parameters during a motion of plotting a character or picture.

Further, in the motion editing apparatus according to the embodiment of the present invention, physical restrictions to a robot can be confirmed during work in which trajectory designing of hand tips and the whole body when a picture or a character is to be plotted is performed. Therefore, there is no possibility that such motion data which causes a robot to execute an incomprehensible motion may be produced.

FIG. 1 schematically shows a hardware configuration of the motion editing apparatus according to the preferred embodiment of the present invention. The motion editing apparatus may be designed as a hardware apparatus for exclusive use. However, the motion editing apparatus may otherwise be implemented in such a form that a predetermined motion editing application is executed on a general computer system such as, for example, a personal computer (PC). Details of the motion editing apparatus are described below.

The motion editing apparatus includes a processor 10 as a principal component thereof. The processor 10 executes various processes based on an application program loaded in a memory under a program execution environment provided by an operating system (OS). An example of such applications is a motion editing application. Further, the processor 10 controls various peripheral apparatus connected thereto through an external bus interface or a bus 30. The following peripheral apparatus are connected to the bus 30.

A memory 20 is formed from a semiconductor memory such as, for example, a DRAM (Dynamic RAM). The memory 20 is used as a memory space for the processor 10 so that program codes to be executed by the processor 10 are loaded or working data of an execution program are temporarily stored.

A display controller 21 produces a display image in accordance with a plotting instruction sent thereto from the processor 10 and sends the produced display image to a display apparatus 22. The display apparatus 22 is connected to the display controller 21 and displays an image on a screen thereof in accordance with display image information sent thereto from the display controller 21.

The motion editing application uses the screen of the display apparatus 22 to display various kinds of information. For example, information regarding hand-written inputted data such as a picture or a character inputted through a mouse or a tablet is displayed. Further, an interaction screen for editing a trajectory design for causing a robot to plot a picture or a character is displayed based on two-dimensional hand-written inputted data. Further, a screen on which inputting, rewriting or confirmation of various setting parameters is to be performed is displayed. On the confirmation screen, motion confirmation of a robot where a plotted character or picture is displayed on a 3D screen together with a robot or confirmation of physical restrictions to a robot whose plotting motion is being executed can be performed. Details of such confirmation are hereinafter described.

An input/output interface 23 is connected to a keyboard 24 and a mouse 25 and transfers an input signal from the keyboard 24 or mouse 25 or a tablet (not shown) to the processor 10.

The motion editing application uses the mouse 25 or the tablet (not shown) as a device for being operated by a user to hand-written input plotting information regarding a picture or a character to be plotted by a robot. For example, the motion editing application reads instruction coordinate data of the mouse 25 and information regarding the on/off state of a mouse button in a predetermined sampling period and connects the data and information as plotting information of a character or a picture by a mouse input. Further, the motion editing application reads instruction coordinate data of the tablet (not shown) and information regarding the writing pressure level of the pen point in a predetermined sampling period and collects the data and information as plotting information of a character or a picture by a tablet input (where the tablet is provided with a writing pressure detecting function).

A network interface 26 is connected to an external network such as a LAN (Local Area Network) or the Internet and controls data communication through the Internet. In particular, the network interface 26 transfers data sent thereto from the processor 10 to another apparatus on the Internet and receives and passes data sent thereto through the Internet to the processor 10. The network interface 26 can receive, for example, a program, data and so forth from the outside through the network.

The motion editing apparatus can download, for example, the motion editing application through the network. Or, the motion editing apparatus can provide edited motion data to another motion editing apparatus through the network or transfer the edited motion data to a robot which executes motion.

A large-capacity external storage apparatus 28 such as a HDD (Hard Disk Drive) is connected to a HDD controller 27, and the HDD controller 27 controls inputting/outputting of data to and from the HDD 28 connected thereto. The HDD 28 stores therein a program of an operating system (OS), application programs and driver programs to be executed by the processor, and edited motion data and other necessary data. In the present embodiment, each program is installed in an executable form in the HDD 28.

It is to be noted that, in order to construct the motion editing apparatus, many other electric circuits than those shown in FIG. 1 are required. However, since such circuits are well known in the art and do not make the subject matter of the present invention, they are omitted in FIG. 1 and in the description of the present specification. Further, it is to be noted that, in order to prevent complicated illustration, only some of connections between the hardware blocks are shown in FIG. 1.

Figure 2:
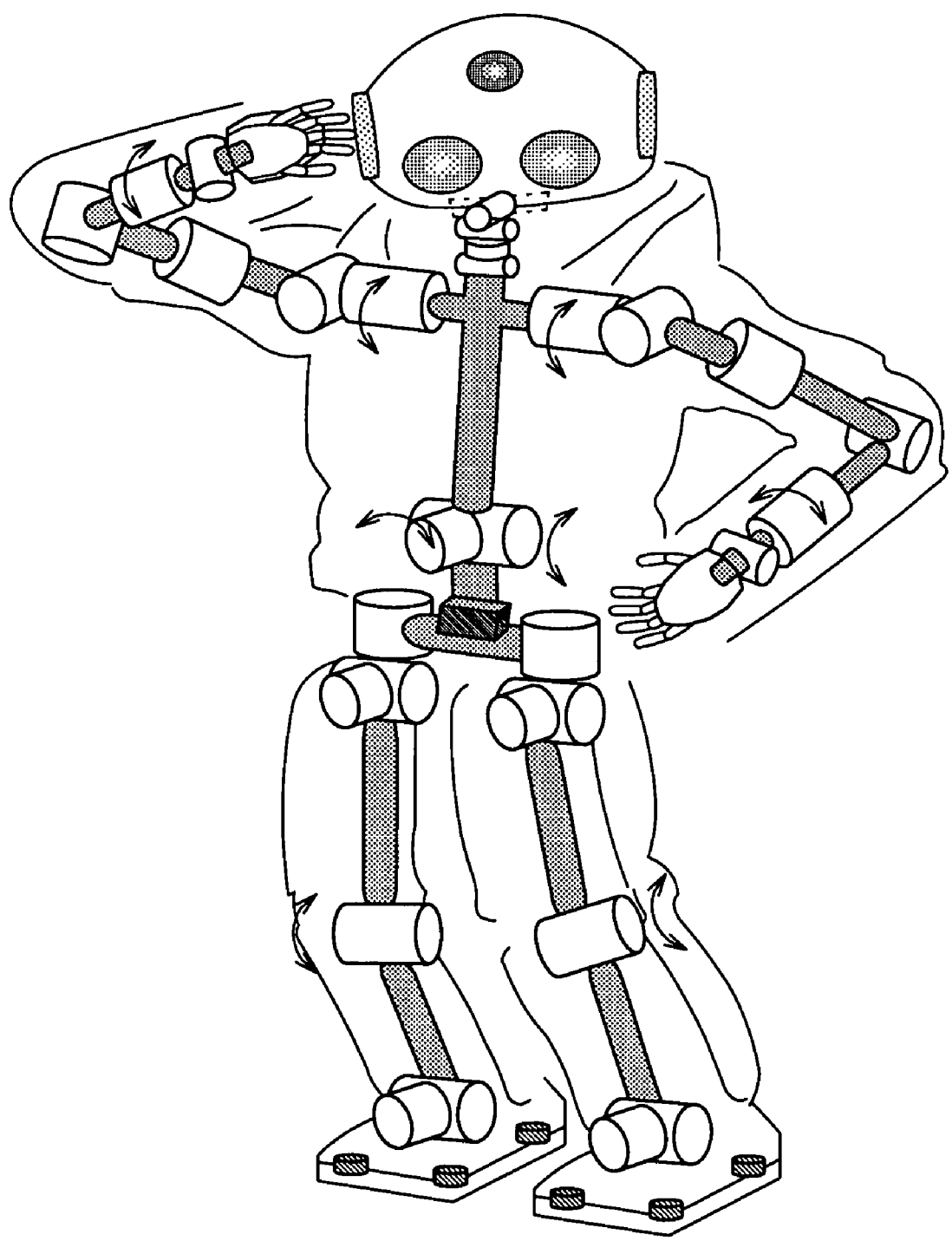
FIG. 2 is a schematic view showing a freedom degree configuration of a robot apparatus on which edited motion data are to be reproduced.

FIG. 2 shows a degree-of-freedom configuration of a robot apparatus on which edited motion data are to be reproduced. Referring to FIG. 2, the robot is of the partner type and is a human-like robot, and includes a pelvis portion, two leg members as moving members connected to the pelvis portion and the upper part of the body connected to the pelvis portion. Two arm members are connected to the upper part of the body, and a head portion is connected to the upper part of the body through a neck joint.

The left and right leg members have totaling six degrees of freedom including three degrees of freedom of the hip joint, one degree of freedom of the knee joint and two degrees of freedom of the ankle joint. Further, the left and right arm members have totaling six degrees of freedom including three degrees of freedom of the shoulder joint, one degree of freedom of the elbow joint and two degrees of freedom of the wrist joint. The neck joint and the waist joint have three degrees of freedom around X, Y and Z axes. Further, the left and right hands have one degree of freedom for the five fingers. Consequently, the partner type robot has totaling 40 degrees of freedom.

An actuator for driving each of joint shafts is formed, for example, from a DC brushless motor and a speed reducer as well as a position sensor for detecting the rotational position of an output power shaft of the speed reducer. The joint driving actuators are connected to a host computer which controls the entire robot apparatus such that they can receive position control target values from the host computer and transmit joint angles and joint angular speeds to the host computer.

Figure 3:
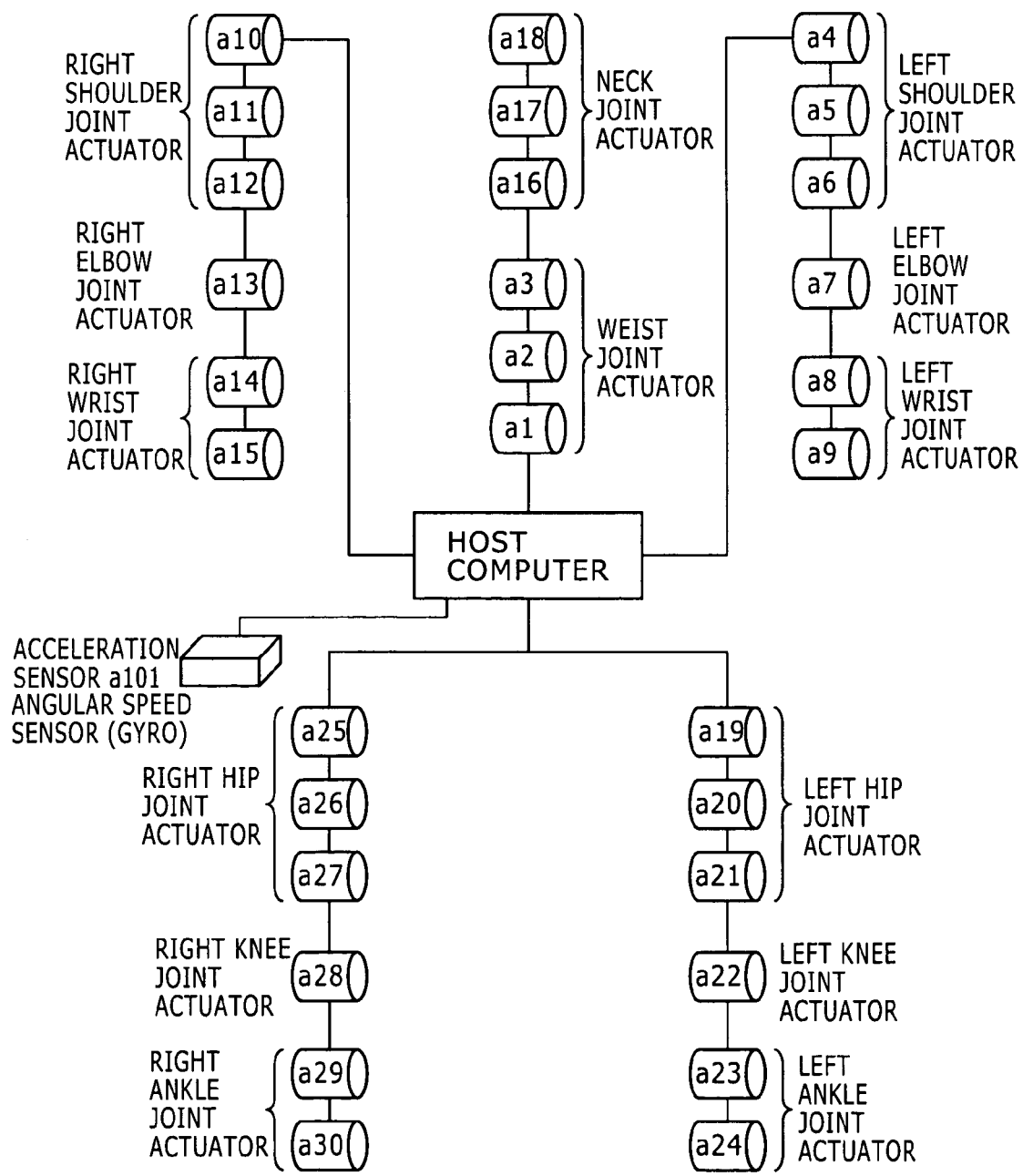
FIG. 3 is a schematic view showing an example of a configuration of a connection topology of the robot apparatus shown in FIG. 2.

FIG. 3 shows an example of a configuration of a connection topology of the robot apparatus shown in FIG. 2.

Referring to FIG. 3, the robot apparatus shown has three-axis waist joint actuators a1, a2 and a3 and three-axis neck joint actuators a16, a17 and a18 at the body part thereof. The waist joint actuators a1, a2 and a3 and the neck joint actuators a16, a17 and a18 are connected serially to the host computer. Each of the waist joint actuators a1, a2 and a3 and the neck joint actuators a16, a17 and a18 receives a position control target value through a serial cable and transmits an output torque, a joint angle and a joint angular speed at present to the host computer.

Further, the robot apparatus has three-axis shoulder joint actuators a4, a5 and a6 a one-axis elbow joint actuator a7 and two-axis wrist joint actuators a8 and a9 at the left arm member. The actuators mentioned are connected serially to the host computer. Similarly, the robot apparatus has three-axis shoulder joint actuators a10, a11 and a12, a one-axis elbow joint actuator a13 and two-axis wrist joint actuators a14 and a15. The actuators mentioned are connected serially to the host computer.

Further, the robot apparatus has three-axis hip joint actuators a19, a20 and a21, a one-axis knee joint actuator a22 and two-axis ankle joint actuators a23 and a24 at the left leg member. The actuators mentioned are connected serially to the host computer. Similarly, the robot apparatus has three-axis hip joint actuators a25, a26 and a27, a one-axis knee joint actuator a28 and two-axis ankle joint actuators a29 and a30. The actuators mentioned are connected serially to the host computer.

Further, the three-axis acceleration sensor a101 and a three-axis angular speed sensor (gyro) are incorporated in the pelvis portion of the robot apparatus. In the proximity of the acceleration sensor a101 and the angular speed sensor, a microcomputer for measuring sensor values of them is disposed, and a result of the measurement is transmitted from the microcomputer to the host computer.

The host computer performs motion control of the robot based on motion data edited by the motion editing apparatus. In particular, the host computer transmits position control target values for the joint actuators defined with the motion data through the respective serial cables. Further, the host computer receives output torques, joint angles and joint angular speeds at present from the joint actuators and performs position posture control based on differences between the target position postures and the position postures at present of the operation members.

In the present embodiment, the host computer uses an operation member corresponding to an end effecter such as a hand tip to perform processing of the motion data for plotting a picture or a character. Further, a parameter relating to force control is added to the motion data, and the host computer performs position posture control based on the force control to implement a robust plotting motion of the robot. Details are hereinafter described.

It is to be noted that the subject matter of the present invention is not limited to the configuration of the robot apparatus shown in FIGS. 2 and 3. The point is that the configuration of the robot may be changed suitably if the robot apparatus includes one or more arms which have an operation member which can plot a character or a picture and motion data of a data format which are outputted from the motion editing apparatus can be executed.

The motion editing apparatus according to the present embodiment provides an editing environment in which even a user who is not acquainted with knowledge of a high level regarding computer programming or motion control of a robot can produce motion data simply and readily through interactions. Editing of motion data for causing a robot to plot a picture or a character is performed based on such interactions as hand-written inputting of a user through a mouse or a tablet. In the following, an editing process of motion data is described.

Figure 4:
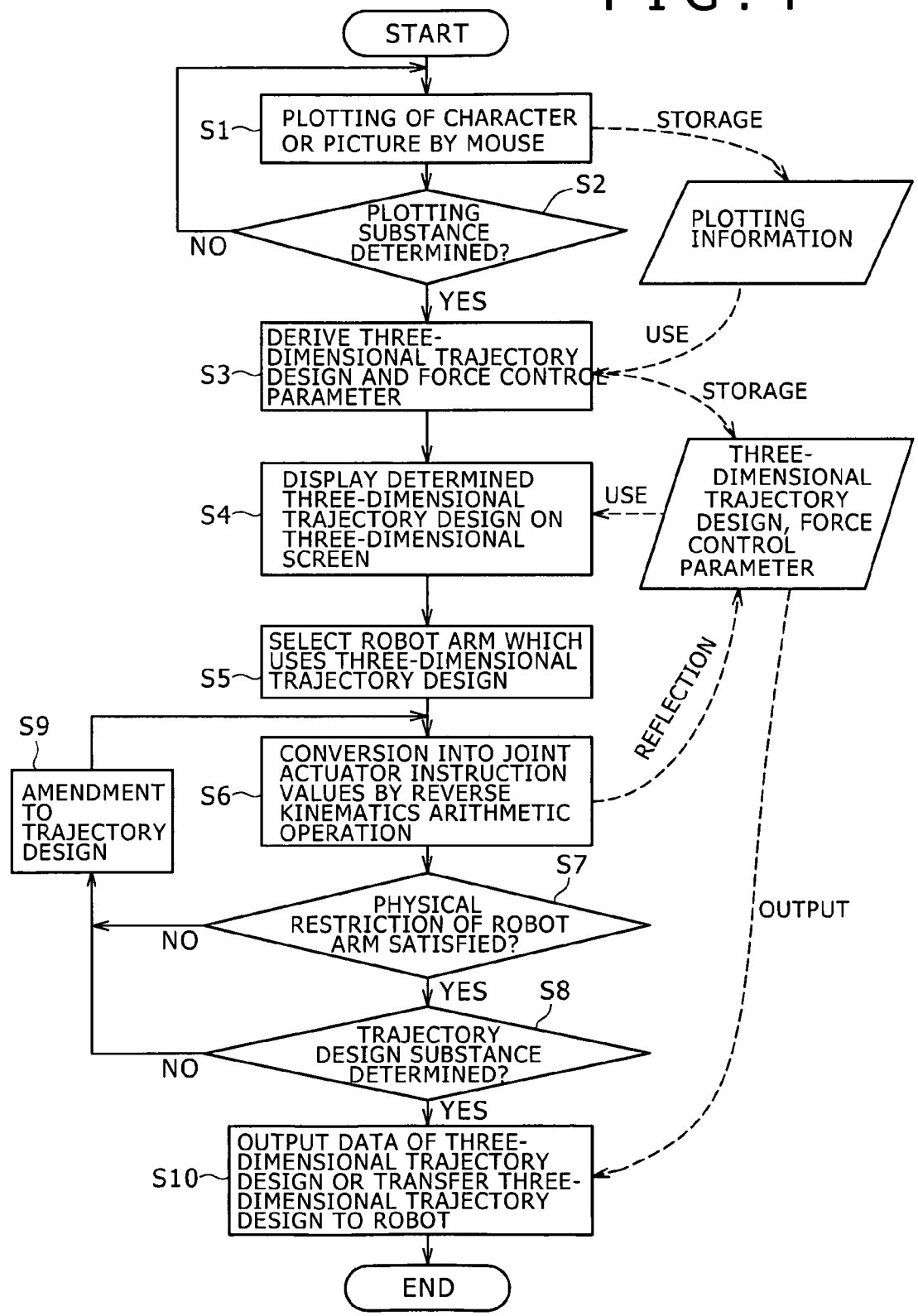
FIG. 4 is a flow chart illustrating a processing procedure for producing a motion design for performing plotting of a picture or a character using hand tips of a robot on the motion editing apparatus.

FIG. 4 illustrates in the form of a flow chart a processing procedure for performing motion designing for plotting a character or a picture using a hand tip or some other end effecter of the robot on the motion editing apparatus.

First, the user would use a coordinate inputting apparatus such as a mouse or a tablet to plot a character or a picture to be plotted by the robot in the form of a hand-written input (step S1).

Consequently, instruction coordinate data of the mouse and information regarding on/off state of a mouse button are read in a predetermined sampling period so that time series data including two-dimensional xy coordinate information and on/off information are collected. The on/off information of the mouse button is used to represent whether or not the pen point contacts with a plotting face and derive a force control parameter. Table 1 below indicates an example of the time series coordinate data collected when the character "A" is plotted by the user using the mouse. In Table 1 below, TRUE represents that the mouse button is on and FALSE represents that the mouse button is off.

TABLE 1

| Time(Sec.) | X(Pixel) | Y(Pixel) | Mouse LButton Down |
|---|---|---|---|
| 0 | 69 | 80 | TRUE |
| 0.484 | 66 | 62 | TRUE |
| 0.64 | 66 | 34 | TRUE |
| 0.797 | 66 | 6 | TRUE |
| 1.015 | 68 | −22 | TRUE |
| 1.25 | 73 | −50 | TRUE |
| 1.359 | 75 | −72 | TRUE |
| 1.719 | 75 | −72 | FALSE |
| 2.203 | 97 | −8 | FALSE |
| 2.562 | 111 | 4 | FALSE |
| 2.703 | 111 | 4 | TRUE |
| 3.094 | 83 | 11 | TRUE |
| 3.297 | 54 | 16 | TRUE |
| 3.484 | 26 | 16 | TRUE |
| 3.625 | −2 | 15 | TRUE |
| 3.781 | −31 | 11 | TRUE |
| 3.89 | −59 | 2 | TRUE |
| 4.219 | −87 | −7 | TRUE |
| 4.469 | −98 | −15 | TRUE |
| 4.719 | −97 | −16 | FALSE |
| 5.203 | −45 | −42 | FALSE |
| 5.687 | 17 | −60 | FALSE |
| 6.047 | 38 | −61 | FALSE |
| 6.109 | 38 | −61 | TRUE |

TABLE 1-continued

| Time(Sec.) | X(Pixel) | Y(Pixel) | Mouse LButton Down |
|---|---|---|---|
| 6.484 | 12 | −47 | TRUE |
| 6.656 | −14 | −34 | TRUE |
| 6.828 | −41 | −22 | TRUE |
| 7.031 | −67 | −8 | TRUE |
| 7.25 | −89 | 11 | TRUE |
| 7.531 | −96 | 40 | TRUE |
| 7.812 | −86 | 68 | TRUE |
| 8.109 | −59 | 81 | TRUE |
| 8.406 | −30 | 76 | TRUE |
| 8.578 | −8 | 57 | TRUE |
| 8.89 | 9 | 33 | TRUE |
| 9.14 | 20 | 6 | TRUE |
| 9.39 | 24 | −23 | TRUE |
| 9.594 | 24 | −52 | TRUE |
| 9.828 | 18 | −81 | TRUE |
| 10.094 | −3 | −102 | TRUE |
| 10.375 | −32 | −109 | TRUE |
| 10.687 | −61 | −104 | TRUE |
| 11.031 | −84 | −87 | TRUE |
| 11.5 | −93 | −62 | TRUE |
| 11.828 | −93 | −62 | FALSE |
| 12.094 | −93 | −62 | FALSE |

On the other hand, where the user uses not the mouse but a tablet with a writing pressure detecting function, instruction coordinate data of the tablet and information regarding the pressing force level of the pen point are read in a predetermined sampling period so that time series data including two-dimensional xy coordinate information and pressing pressure level information are collected (refer to Table 2). In this instance, the writing pressure data acquired in a time series can be used as they are as force control parameters through a scaling or filtering process.

TABLE 2

| Time(Sec.) | X(Pixel) | Y(Pixel) | Writing Pressure Level(0-511) |
|---|---|---|---|
| 0 | 69 | 80 | 321 |
| 0.484 | 66 | 62 | 378 |
| 0.64 | 66 | 34 | 456 |
| 0.797 | 66 | 6 | 468 |
| 1.015 | 68 | −22 | 348 |
| 1.25 | 73 | −50 | 215 |
| 1.359 | 75 | −72 | 153 |
| 1.719 | 75 | −72 | 0 |
| 2.203 | 97 | −8 | 0 |
| 2.562 | 111 | 4 | 0 |
| 2.703 | 111 | 4 | 156 |
| 3.094 | 83 | 11 | 267 |
| 3.297 | 54 | 16 | 374 |
| 3.484 | 26 | 16 | 469 |
| 3.625 | −2 | 15 | 488 |
| 3.781 | −31 | 11 | 486 |
| 3.89 | −59 | 2 | 468 |
| 4.219 | −87 | −7 | 341 |
| 4.469 | −98 | −15 | 163 |
| 4.719 | −97 | −16 | 0 |
| 5.203 | −45 | −42 | 0 |
| 5.687 | 17 | −60 | 0 |
| 6.047 | 38 | −61 | 0 |
| 6.109 | 38 | −61 | 134 |
| 6.484 | 12 | −47 | 246 |
| 6.656 | −14 | −34 | 347 |
| 6.828 | −41 | −22 | 489 |
| 7.031 | −67 | −8 | 468 |
| 7.25 | −89 | 11 | 469 |
| 7.531 | −96 | 40 | 488 |
| 7.812 | −86 | 68 | 494 |
| 8.109 | −59 | 81 | 501 |
| 8.406 | −30 | 76 | 499 |
| 8.578 | −8 | 57 | 457 |

TABLE 2-continued

| Time(Sec.) | X(Pixel) | Y(Pixel) | Writing Pressure Level(0-511) |
|---|---|---|---|
| 8.89 | 9 | 33 | 464 |
| 9.14 | 20 | 6 | 456 |
| 9.39 | 24 | −23 | 432 |
| 9.594 | 24 | −52 | 381 |
| 9.828 | 18 | −81 | 335 |
| 10.094 | −3 | −102 | 255 |
| 10.375 | −32 | −109 | 278 |
| 10.687 | −61 | −104 | 186 |
| 11.031 | −84 | −87 | 121 |
| 11.5 | −93 | −62 | 23 |
| 11.828 | −93 | −62 | 0 |
| 12.094 | −93 | −62 | 0 |

Instruction inputting of coordinate values is performed repetitively until after the user determines the substance of plotting (step S2). At this time, since a trajectory of plotting remains on the screen, the user can confirm the substance being plotted by the user at any time.

Figure 5:
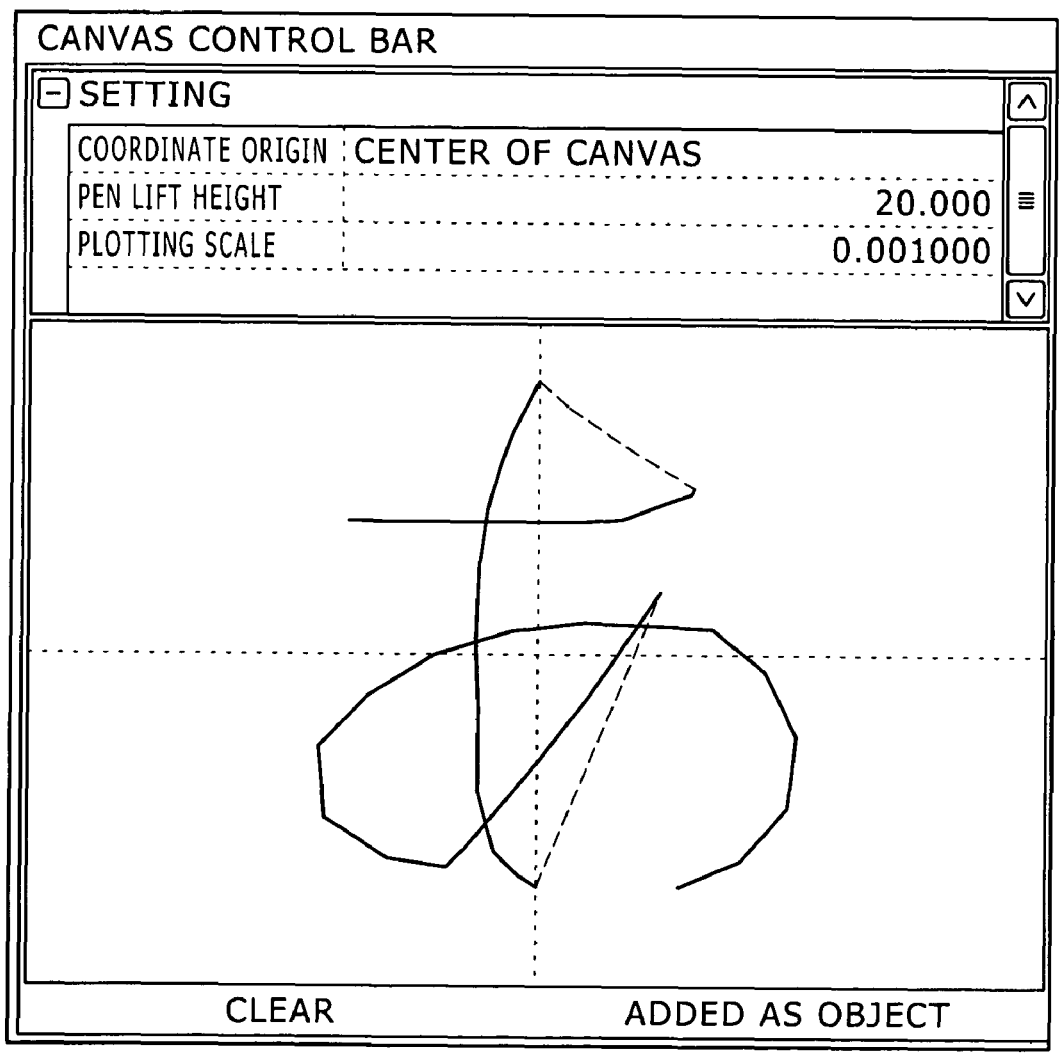
FIG. 5 is a view illustrating plotting information on xyz axes when two-dimensional plotting information plotted by an operation of a mouse is converted into a three-dimensional plotting trajectory.

Here, it is assumed that the user inputs the character "A" as seen in FIG. 5. A trajectory within a period within which the mouse button is kept operated on corresponds to a motion of actually performing plotting and is represented by a solid line on the screen. On the other hand, a trajectory within a period within which the mouse button remains off corresponds to a motion of moving the pen in a spaced relationship from the plotting face without actually performing plotting. The trajectory in this instance is represented by a broken line on the screen. Where the tablet is used in place of the mouse, a trajectory along which the pressing level against the tablet exceeds a predetermined value is represented by a solid line. On the other hand, a trajectory along which the pressing level is equal to or lower than the predetermined value is represented by a broken line.

Then, a three-dimensional trajectory design and force control parameters are derived based on the two-dimensional plotting information and the on/off information or the force control information inputted from the mouse or the tablet (step S3).

At the processing step S3, the time series information of the two-dimensional xy coordinates inputted from the mouse or the tablet is subject to undergo conversion (scale conversion from a unit of a pixel into a unit of meter) between the coordinate instruction space and a world coordinate system. Then, resulting information is used as it is as a trajectory on the x axis and the y axis on the three-dimensional trajectory design, that is, as time series coordinate information on the two-dimensional xy plane. Further, within a period within which plotting is proceeding with the mouse button operated on, zero is given as the z coordinate value so as to represent that the pen point remains in contact with the plotting face. On the other hand, within any other period within which the mouse button remains off and plotting is not proceeding, a positive value, that is, a height, is given as the z coordinate value so as to represent that the pen point remains spaced away from the plotting face. A trajectory on the z axis is determined thereby.

Or, within a period within which the writing pressure on the tablet with a writing pressure detection function exceeds the predetermined value and writing is proceeding, zero is given as the z coordinate value so as to represent that the pen point remains in contact with the plotting face. On the other hand, within any other period within which the writing pressure detected by the tablet is equal to or lower than the predetermined value and plotting is not proceeding, a positive value, that is, a height, is given as the z axis value so as to represent that the pen point remains spaced away from the plotting face.

A three-dimensional plotting trajectory derived from the time series data including two-dimensional xy coordinate information and on/off information based on mouse inputs and illustrated in Table 1 hereinabove is indicated as a trajectory on the xy plane and a trajectory on the z axis in Table 3 and Table 4 below, respectively.

TABLE 3

| Time(Sec.) | X(m) | Y(m) | Interpolation |
|---|---|---|---|
| 0 | 0.0207 | 0.024 | spline |
| 0.484 | 0.0198 | 0.0186 | spline |
| 0.64 | 0.0198 | 0.0102 | spline |
| 0.797 | 0.0198 | 0.0018 | spline |
| 1.015 | 0.0204 | −0.0066 | spline |
| 1.25 | 0.0219 | −0.015 | spline |
| 1.359 | 0.0225 | −0.0216 | spline |
| 1.719 | 0.0225 | −0.0216 | spline |
| 2.203 | 0.0291 | −0.0024 | spline |
| 2.562 | 0.0333 | 0.0012 | spline |
| 2.703 | 0.0333 | 0.0012 | spline |
| 3.094 | 0.0249 | 0.0033 | spline |
| 3.297 | 0.0162 | 0.0048 | spline |
| 3.484 | 0.0078 | 0.0048 | spline |
| 3.625 | −0.0006 | 0.0045 | spline |
| 3.781 | −0.0093 | 0.0033 | spline |
| 3.89 | −0.0177 | 0.0006 | spline |
| 4.219 | −0.0261 | −0.0021 | spline |
| 4.469 | −0.0294 | −0.0045 | spline |
| 4.719 | −0.0291 | −0.0048 | spline |
| 5.203 | −0.0135 | −0.0126 | spline |
| 5.687 | 0.0051 | −0.018 | spline |
| 6.047 | 0.0114 | −0.0183 | spline |
| 6.109 | 0.0114 | −0.0183 | spline |
| 6.484 | 0.0036 | −0.0141 | spline |
| 6.656 | −0.0042 | −0.0102 | spline |
| 6.828 | −0.0123 | −0.0066 | spline |
| 7.031 | −0.0201 | −0.0024 | spline |
| 7.25 | −0.0267 | 0.0033 | spline |
| 7.531 | −0.0288 | 0.012 | spline |
| 7.812 | −0.0258 | 0.0204 | spline |
| 8.109 | −0.0177 | 0.0243 | spline |
| 8.406 | −0.009 | 0.0228 | spline |
| 8.578 | −0.0024 | 0.0171 | spline |
| 8.89 | 0.0027 | 0.0099 | spline |
| 9.14 | 0.006 | 0.0018 | spline |
| 9.39 | 0.0072 | −0.0069 | spline |
| 9.594 | 0.0072 | −0.0156 | spline |
| 9.828 | 0.0054 | −0.0243 | spline |
| 10.094 | −0.0009 | −0.0306 | spline |
| 10.375 | −0.0096 | −0.0327 | spline |
| 10.687 | −0.0183 | −0.0312 | spline |
| 11.031 | −0.0252 | −0.0261 | spline |
| 11.5 | −0.0279 | −0.0186 | spline |
| 11.828 | −0.0279 | −0.0186 | spline |
| 12.094 | −0.0279 | −0.0186 | spline |

TABLE 4

| Time(Sec.) | Z(m) | Interpolation |
|---|---|---|
| 0 | 0 | spline |
| 1.45 | 0 | spline |
| 2.05 | 0.02 | spline |
| 2.703 | 0 | spline |
| 4.719 | 0 | spline |
| 5.219 | 0.02 | spline |
| 5.609 | 0.02 | spline |
| 6.109 | 0 | spline |
| 11.828 | 0 | spline |
| 12.328 | 0.02 | spline |

In Table 4, the z axis is set to zero when the mouse depression information is TRUE, but is set to twenty when the mouse depression information is FALSE. Where the tablet is used, the value on the z axis is derived based on the writing pressure data.

The trajectory on the xy plane and the trajectory on the z axis of the three-dimensional plotting trajectory are produced by smoothly interconnecting adjacent sampling points taking physical restrictions to the joint actuators of the robot into consideration. In Table 3 and Table 4, sampling points are interconnected through spline interpolation. FIG. 6 illustrates plotting information on the x, y and z axes when two-dimensional plotting information plotted by mouse operations is converted into a three-dimensional plotting trajectory. In FIG. 6, the axis of abscissa is the time axis.

It is to be noted that the reason why the trajectory on the xy plane and the trajectory on the z axis are stored separately in the separate tables from each other is that the sampling periods are different from each other. For the former trajectory, coordinate values are supplied in a short sampling period from the coordinate inputting apparatus, but for the latter trajectory, on/off operations of the mouse button or operations to place the pen point into and out of contact with the surface of the tablet are performed at comparatively long intervals.

Meanwhile, the force control parameter is used to perform force control such as control of the pressure (target force) to be applied to the pen point when the robot performs a motion of plotting a character or a picture. Where the user uses the tablet with a writing pressure detection function to plot a character or a picture at step S1, writing pressure data acquired in a time series then are converted into and used as a force control parameter to be used as a target force in the z axis direction through a scaling process, a filtering process or the like. On the other hand, where the mouse is used to input plotting information, the force control parameter is set to a high value within a period within which the mouse button is on, that is, the value on the z axis is zero and the pen point is kept pressed against the plotting face, but it is set to a low value within another period within which the mouse button is off, that is, the z axis has a high value and the pen point is spaced from the plotting face.

Figure 7:
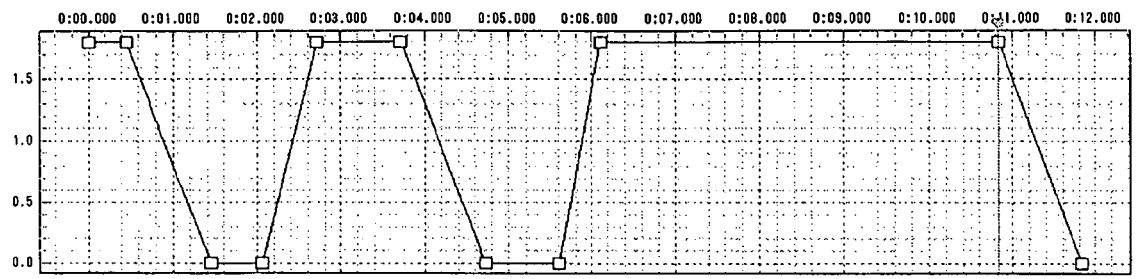
FIG. 7 is a view corresponding to FIG. 6 and illustrating an example wherein a target force in the z axis direction is derived.

FIG. 7 illustrates an example wherein the target force in the z axis direction is derived in a corresponding relationship to FIG. 6. As can be recognized from comparison between the trajectory in the z axis direction shown in FIG. 6 and FIG. 7, within a period within which the z axis is zero, that is, the pen point is pressed against the plotting face, the target force as the force control parameter is set to a high value, but within another period within which the value on the z axis is a positive value, that is, the pen point is spaced from the plotting face, the target force is set to zero.

Table 5 indicates the force control parameter derived from the trajectory design in the z axis direction illustrated in FIG. 4. In Table 5, two force control parameters including the target force in the z axis direction and an application rate α are used. Then, adjacent sampling points are interconnected smoothly through spline interpolation or the like taking physical restrictions to the joint actuators of the robot into consideration.

TABLE 5

| Time(Sec.) | F-Z axis(N) | Rate α | Interpolation |
|---|---|---|---|
| 0 | 1.8 | 0.9 | linear |
| 0.45 | 1.8 | 0.9 | linear |
| 1.45 | 0 | 0 | linear |
| 2.05 | 0 | 0 | linear |

TABLE 5-continued

| Time(Sec.) | F-Z axis(N) | Rate α | Interpolation |
|---|---|---|---|
| 2.703 | 1.8 | 0.9 | linear |
| 3.719 | 1.8 | 0.9 | linear |
| 4.719 | 0 | 0 | linear |
| 5.609 | 0 | 0 | linear |
| 6.109 | 1.8 | 0.9 | linear |
| 10.828 | 1.8 | 0.9 | linear |
| 11.828 | 0 | 0 | linear |

The target force in the z axis direction corresponds to a force for pressing the pen point against the plotting face. The target force in the z axis direction at each point of time is determined based on the coordinate value in the z axis direction. Meanwhile, the application rate α is an index value representative of a ratio at which a target position posture determined taking the force control into consideration occupies a target position posture defined by motion data when the robot performs position posture control for plotting a character or a picture in accordance with the motion data.

For example, if the application rate α is raised, then target position posture control in which force control takes priority is performed, and therefore, the application rate α is set to a comparatively high value at a solid line portion which is plotted by the pen point. On the other hand, where the application rate α is set to a low value, since importance is attached to a target position posture defined by the motion data, within a period within which the pen is moved in a spaced relationship from the plotting face, the application rate α is set to a comparatively low value so that plotting of a trajectory as given by the motion data is executed in fidelity. As can be recognized from comparison between the trajectory in the z axis direction shown in FIG. 6 and the target force and the application rate α indicated in Table 5, a high value is given as the application rate a within a period within which the pen point contacts with the plotting face and the target force as a force control parameter is set to a high value. On the other hand, within another period within which the pen point is spaced from the plotting face and the target force is set to zero, the application rate a is set to zero.

Where a force control parameter is described in addition to motion data, the robot which reproduces the motion data can actually perform, during a motion of plotting a character or a picture, a plotting motion with a writing pressure into consideration based on the force control parameter. Further, since the robot apparatus which reproduces the motion data performs a plotting motion of a picture or a character while it performs the force control in accordance with the force control parameter, the robot apparatus can be applied readily to an object which moves or changes its shape while plotting is proceeding. A process for actually reproducing motion data with a force control parameter on the robot is hereinafter described.

In the present embodiment, motion data for a robot include a three-dimensional plotting trajectory indicated in Table 3 and Table 4 and force control parameters indicated in Table 5. Further, the motion data after they are represented by instruction values to the joint actuators by re-arranging the motion data in a three-dimensional space in which the robot is to work to perform coordinate conversion of the motion data at succeeding processing steps are used as motion data to be inputted actually to the robot.

Figure 8:
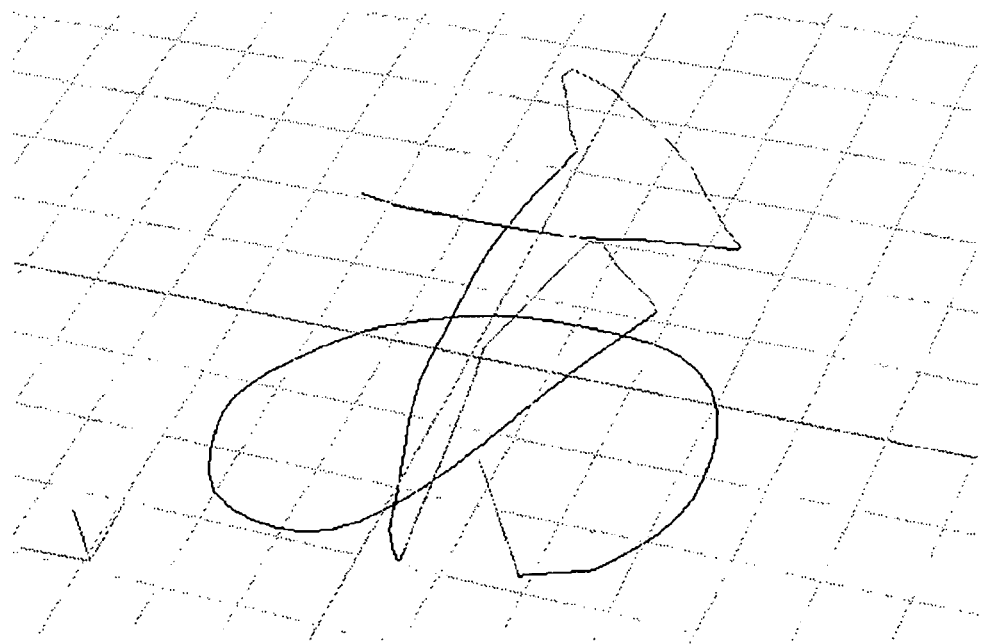
FIG. 8 is a perspective view illustrating a manner wherein a derived three-dimensional trajectory design is displayed on a three-dimensional screen.

Succeeding processes are described below referring back to FIG. 4. At step S4, the three-dimensional trajectory design derived at step S3 is displayed on a three-dimensional screen. A manner of the display is illustrated in FIG. 8. Since the trajectory of plotting remains on the screen, the user can confirm the substance being plotted by the user at any time.

Further, the user can re-arrange the three-dimensional trajectory design through interactions through the three-dimensional display screen. In particular, the user can apply movement, rotation or coordinate conversion as occasion demands to the three-dimensional trajectory design to re-arrange the three-dimensional trajectory plane at an arbitrary place in a three-dimensional space which is a working space of the robot. Further, the user can designate an operation location for which plotting of a character or a picture is to be performed in accordance with the three-dimensional trajectory design through interactions through the three-dimensional screen (step S5). Here, the user would designate a hand tip of which one of the left and right robot arms should be used to plot the character or the picture designated by the re-arranged three-dimensional trajectory design.

After the plotting information of the character or the picture inputted by the user is re-arranged in the three-dimensional space and the robot arm to be used to plot the character or the picture is designated in such a manner as described above, the motion editing apparatus converts the plotting trajectory into trajectories of instruction values of the joint actuators of the designated arm by inverse kinematics arithmetic operation (step S6).

Then, the motion editing apparatus reproduces a manner in which the robot acts along the trajectory designs of the instruction values obtained by the conversion on the three-dimensional screen (refer to FIG. 9). The user can observe the screen to confirm a manner in which the robot plots the character or picture hand-written inputted by the user in the three-dimensional space.

Thereafter, the motion editing apparatus confirms, when the robot plots the character or the picture in accordance with the three-dimensional trajectory re-arranged in the three-dimensional space, whether or not it is contrary to angle restrictions and angular speed restrictions to the joint actuators which are physical restrictions to the robot arm, an output torque restriction, interference with a part by a motion and so forth (step S7).

Here, if it is found that the motion editing apparatus is contrary to some physical restriction, then the motion editing apparatus presents the detailed substance to the user and urges the user to execute re-editing.

On the other hand, if the motion editing apparatus is not contrary to any physical restriction, then it further urges the user to determine whether or not the user is satisfied with the substance of the three-dimensional trajectory design (step S8). Even if the edited three-dimensional trajectory design is not contrary to any physical restriction, the user can repeat the processing steps described above to perform re-editing for alteration into a smoother motion or the like until a motion with which the user is satisfied is obtained.

If it is decided at step S7 that the three-dimensional trajectory design is contrary to some physical restriction, or if the user is not satisfied with the edited three-dimensional trajectory design, then the user would amend the substance of the trajectory design (step S9). More particularly, the following substance can be amended:

(1) re-arrangement of plotting data in the three-dimensional space;
(2) change of the size of the plotting data;
(3) decrease or increase of the plotting time;
(4) change of the three-dimensional trajectory in the plotting data; and
(5) change of a force control parameter.

Then, after a three-dimensional trajectory design for plotting is determined, the substance of the three-dimensional trajectory design is outputted as an information file which can be loaded into the host computer of the robot (step S10). Alternatively, the substance may be transferred directly to the robot.

In the motion editing apparatus according to the present embodiment, motion data with a force control parameter such as a target force or an application rate α can be edited. Then, since the force control parameter is described in addition to the motion data, during a motion of plotting a character or a picture, the robot which reproduces the motion data can perform a plotting motion with a writing pressure taken into consideration based on the force control parameter. Further, the robot apparatus which reproduces the motion data performs a plotting motion of a picture or a character while it performs force control in accordance with the force control parameter. Therefore, the robot apparatus can be applied readily also to an object which moves or whose shape changes while plotting is proceeding.

Here, a process of the robot apparatus for reproducing a three-dimensional trajectory design defined by motion data while a force control parameter is used is described.

The force control for a certain operation member of the robot, that is, virtual compliance control, can be represented by the following expression (1). The operation member here is a member which corresponds to an end effecter such as hand tips which grip a pen in order to plot a character or a picture.

$$M \cdot \ddot{x} + D \cdot (\dot{x} - \dot{x}_d) + K \cdot (x - x_d) = SF + (E-S)K_f(F+F_d) \quad (1)$$

where F is the force generated at the operation member and is a six-dimensional vector composed of six factors including three translating forces $F_x$, $F_y$, $F_z$ which act in the x, y and z axis directions and three torques $F_{roll}$, $F_{pitch}$, $F_{yaw}$ around the roll, pitch and yaw axes. Also $F_d$ is a similar six-dimensional vector and indicates a target force at the member (for example, a force of pressing the pen point against the plotting face). The six-dimensional vector $F_d$ is given as output control parameters in motion data. Further, x is the instruction position posture with respect to the operation member which is determined by force control, and $x_d$ is the target position posture for the operation member. The suffixes n, n+1, n−1 appearing as above indicate the time at present, the time preceding by a one-cycle period and the time succeeding by a one-cycle period, respectively. The constants M, D, K and $K_f$ are the virtual mass, virtual damper constant, virtual spring constant and force feedback gain, respectively.

Further, E is the unit matrix, and S is the switch matrix diag $(S_1, \ldots, S_6)$. When S=E, the control system acts as an omnidirectional impedance control system, but when S=0, the control system acts as an omnidirectional force control system. x and $x_d$ are six-dimensional vectors similarly to F. Further, M, D, K, $K_f$ E and S are 6×6 matrices.

It is to be noted that, where, in the expression (1) given hereinabove, the weight of an end portion with respect to a force sensor mounting position is very great and an influence of the weight cannot be ignored, the influence of the weight is calculated, and the force and the moment are fed forward so as to perform weight compensation.

Further, since, in the expression (1) above, the time differentiated term of the target position posture $x_d$ of the operation member relies upon the accuracy of a servo system, it may suitably be omitted from the expression (1).

Then, where the robot is controlled in a control period of the interval of Δt, the force control expression at time n can be represented as the following expression (2):

$$SF + (E-S)K_f(F+F_d) = M \cdot \frac{(x_{n+1} - x_n) - (x_n - x_{n-1})}{\Delta t^2} + \quad (2)$$
$$D \cdot \frac{(x_n - x_{n-1}) - (x_{dn} - x_{d(n-1)})}{\Delta t} + SK \cdot (x_n - x_{dn})$$

It is to be noted that, in the expression (2) above, the time differentiated term of the target position posture $x_d$ of the operation member relies upon the servo system, the term of D $(x_{dn}-x_{d(n-1)})/\Delta t$ may be omitted suitably from the expression (2).

When the force control is performed, an instruction position posture $x_{n+1}$ of the operation member at a next point of time which is a reference to instruction values to the actuators is required, and this can be determined by solving the expression (2) above.

In the expression above, those parameters which are used for the force control include the force $F_d$ which makes a target for the operation member, the virtual damper constant D, the virtual spring constant K and so forth. The force $F_d$ which makes a target can be derived from plotting information when the user uses the mouse or the tablet to hand-written input a character or a picture or can be acquired directly from the writing pressure, and can be provided as a force control parameter to be added to motion data as indicated in Table 5 to the control system for the robot as described hereinabove. On the other hand, where plotting information is obtained using a tablet with a writing pressure detection function, writing pressure data acquired in a time series can be converted into values of $F_d$ through a scaling or filtering process or the like.

As an instruction value to an operation member of a robot, two instruction values are available including an instruction value $x_{n+1}^{draw}$ of an arm trajectory for plotting defined by a motion editor and an instruction value $x_{n+1}$ which is based on the force control. After an instruction position posture $x_{n+1}$ of the operation member at a next point of time is determined as a reference for an instruction value to the actuator based on the force control from the expressions (2) and (3) given hereinabove, a final instruction value $x_{n+1}^{target}$ to the actuator is determined based on the application rate a given as the force control actuator.

The application rate α is an index value representative of a ratio or a contribution of the instruction value based on the force control with respect to the instruction value defined by the motion data as described hereinabove. The final instruction value $x_{n+1}^{target}$ to the actuator is represented by a relationship between the instruction value $x_{n+1}^{draw}$ of the arm trajectory for performing plotting defined by the motion editor and the instruction value $x_{n+1}$ based on the force control. In particular, the final instruction value $x_{n+1}^{target}$ is given by the following expression (3):

$$x_{n+1}^{target} = x_{n+1} \cdot \alpha + x_{n+1}^{draw} \cdot (1-\alpha) \quad (3)$$

For example, if the application rate α is set to a high value, then target position posture control in which the force control is taken into consideration is performed, and therefore, the application rate α is preferably set to a high value within a period within which an arm of the robot plots with the pen point thereof. In contrast, if the application rate α is set to a low value, then importance is attached to the target position posture defined by the motion data, and therefore, within a period within which the arm of the robot moves the pen with the pen spaced from the plotting face, the application rate a is preferably set to a lower value so that plotting of a trajectory as defined by the motion data is executed in fidelity.

Figure 10:
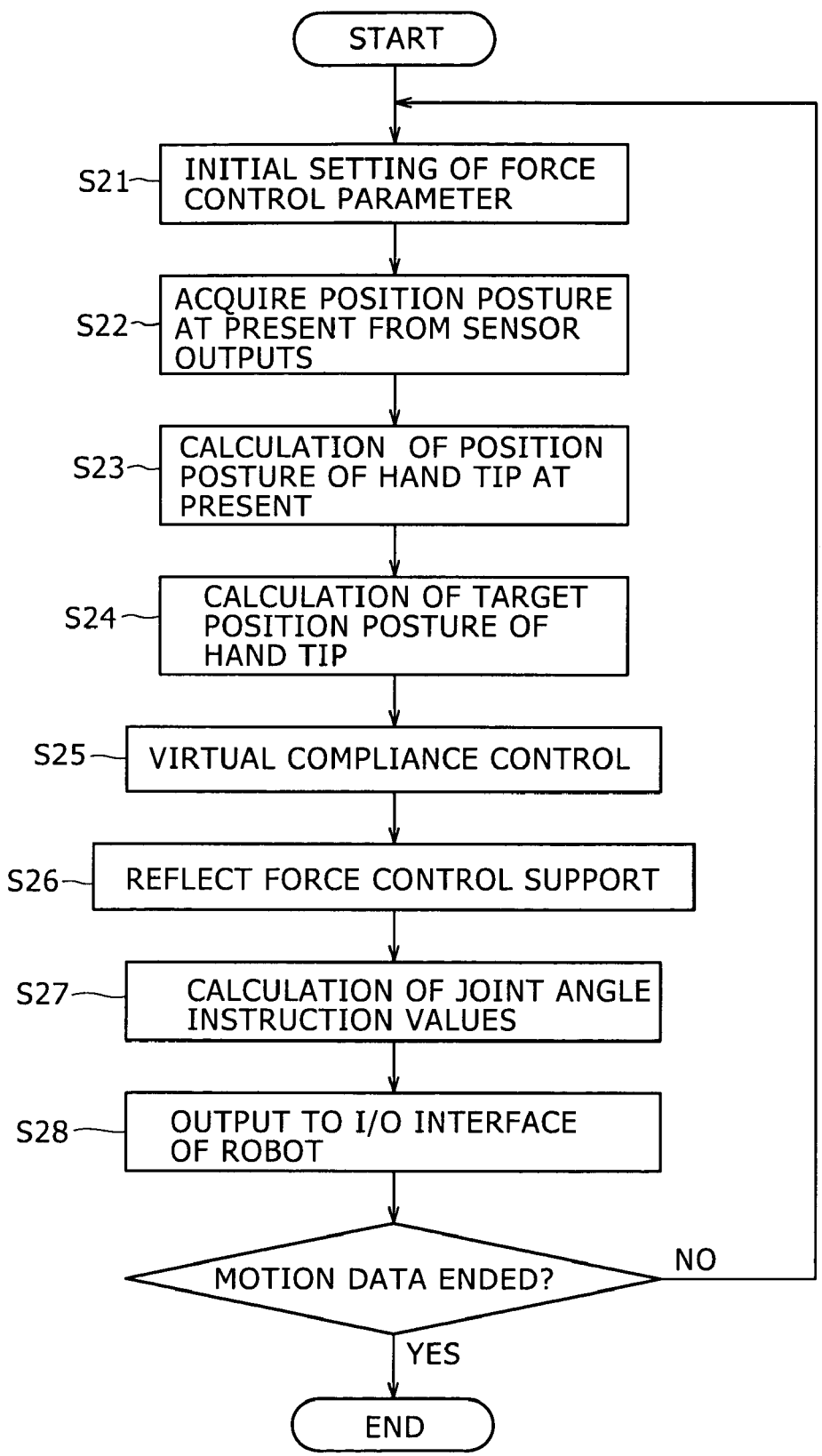
FIG. 10 is a flow chart illustrating a processing procedure for causing a robot to reproduce motion data with a force control parameter and perform a plotting motion.

FIG. 10 illustrates a processing procedure for allowing the robot to reproduce motion data with a force control parameter to perform a plotting motion in the form of a flow chart. Such a processing procedure as just mentioned is executed, for example, by the host computer which controls the motion of the robot. However, the operation member in the following description is, for example, a hand tip of an arm which holds a pen for performing plotting.

First, as initialization of force control parameters, virtual constants such as the virtual mass M, virtual damper constant D and virtual spring constant K and other modeling data are set (step S21).

Then, the state at present of the robot is acquired from the various sensors (step S22). The sensor values to be acquired may include values of the rotational angle, rotational angular velocity and torque obtained from the joint actuators and values of the acceleration sensor, the posture sensor and six-axis force sensors disposed at the waist portion. At the step, a force F applied from the outside to the operation member can be obtained.

Then, a current position posture $x_n$ of the operation member is calculated by forward kinematics arithmetic operation based on feedback values from the joint actuators (step S23). For example, a target position of the hand tip at a next point of time is calculated by trajectory production arithmetic operation or motion reproduction.

Then, a target position posture $x_{n+1}^{draw}$ of the operation member at a next point of time is determined based on the motion data (step S24). For example, a target position of the hand tip at a next point of time is calculated by trajectory production arithmetic operation or motion reproduction of the entire body.

Then, the instruction position posture $x_{n+1}$ of the operation member at a next point of time based on the force control is determined (step S25). In particular, a hand tip instruction position posture at a next point of time is determined based on the force sensor values, target force values, a history of the hand tip instruction position posture, a hand tip target position posture and a current position posture of the hand tip. More particular, the instruction position posture $x_{n+1}$ can be determined by solving the expressions (2) and (3) given hereinabove.

Then, after the instruction position posture $x_{n+1}$ of the operation member at a next point of time based on the force control is determined, a final instruction position posture $x_{n+1}^{target}$ on which the application rate $\alpha$ is reflected is determined using the expression (3) given hereinabove (step S26).

Thereafter, angle instruction values $\theta_{n+1}^{target}$ for the joint actuators of the individual members are calculated using inverse kinematics arithmetic operation from the final angle instruction values $\theta_{n+1}^{target}$ (step S27).

The angle instruction values $\theta_{n+1}^{target}$ for the joint actuators determined in such a manner as described above are outputted to the input/output device of the robot so that the joint actuators are operated (step S28).

Such processes at steps S22 to S28 as described above are executed repetitively until the motion data are ended.

In the motion design application for a robot, the reference coordinates for position instructions for the individual members can be set arbitrarily. For example, where the robot includes a plurality of operation members like the right hand and the left hand, when one of the operation members is used to provide an operation for an operation object, the other operation member can be used to acquire current position posture information regarding the operation object and a more accurate reference coordinate for providing an operation for the operation object can be set.

As a more particular example, the left hand of the robot is used to support the plotting surface of a canvas or the like installed at an arbitrary place in the air by the force control or the like and acquire current position posture information regarding the plotting surface to set more accurate reference coordinates for performing plotting. Then, a trajectory of a more accurate target position posture of the hand tip of the right hand in which the pen is held is calculated based on the reference coordinate system. In particular, local coordinates of the hand tip of the left hand are taken as an origin and a relative position instruction of the hand tip of the right hand is discharged as motion data, and the data are utilized effectively on the actual machine side. Consequently, a robust plotting function can be implemented.

First, the left hand is controlled using the virtual compliance control described hereinabove so that the palm of the left hand traces the plane and a fixed weight is applied in a vertically downward direction by the palm of the left hand. This provides an effect that the writing surface can be held down with the left hand.

Then, a position posture of the hand tip of the left hand is determined from the values of the joint angle sensors of the left arm. Meanwhile, the right hand in which the pen is held is operated so that the hand tip of the right hand moves to a position posture described in the motion data with reference to the origin provided by the position of the left hand.

According to the process just described, even if the surface of an object of plotting is moved or inclined, the trajectory of the hand tip of the left hand follows up the movement of the surface felt through the palm of the left hand. Consequently, a robust plotting function can be implemented.

Figure 11:
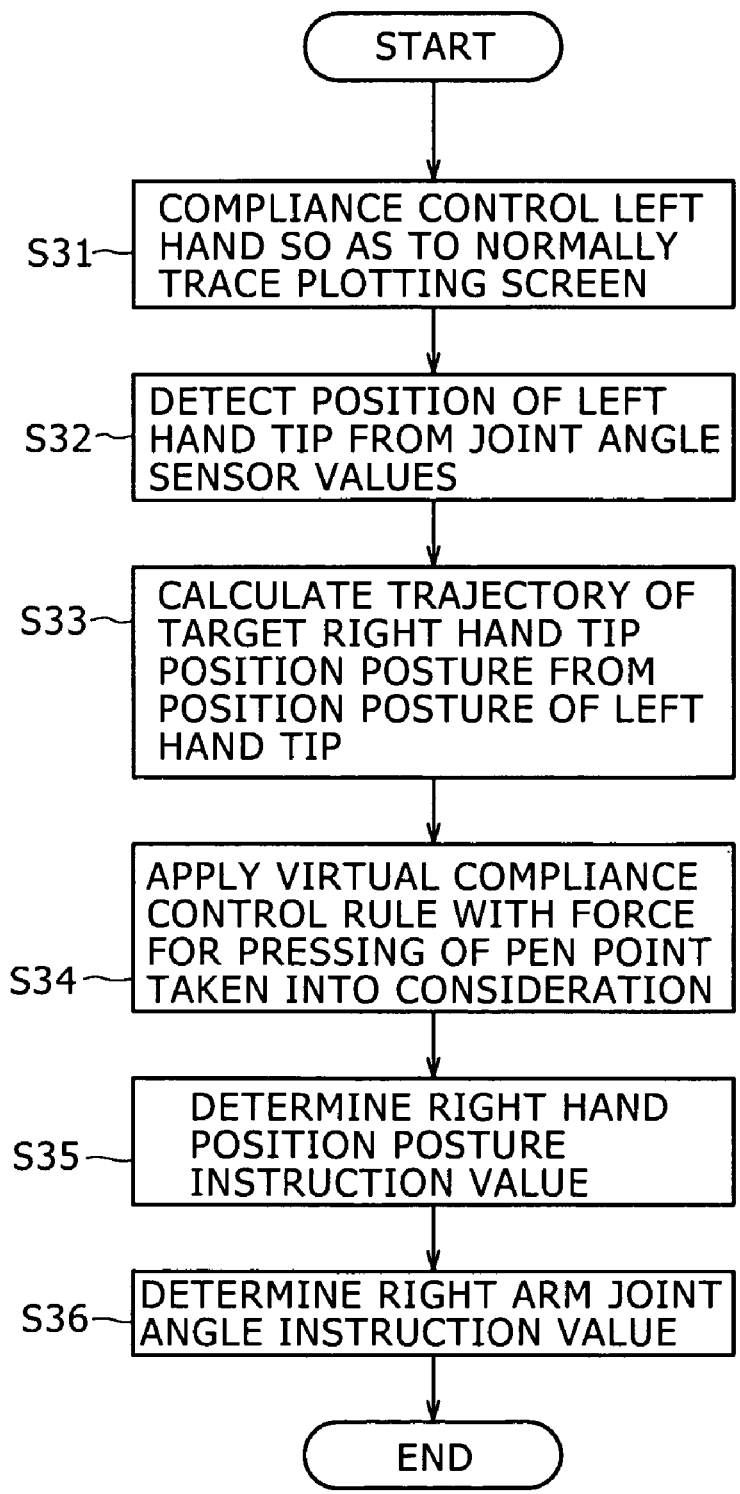
FIG. 11 is a flow chart illustrating a processing procedure for performing robust plotting by cooperative motion of the right hand which holds a pen and the left hand which follows a plotting face.

FIG. 11 illustrates a processing procedure for causing the robot to plot robustly through cooperation of the right hand in which the pen is held and the left hand which follows up the plotting surface. Such a processing procedure as just mentioned is executed, for example, by the host computer which controls motion of the robot.

First, the left hand is controlled using the virtual compliance control described hereinabove so that the palm of the left hand normally traces a plane as a plotting surface and a fixed weight is applied in a vertically downward direction from the palm of the left hand (step S31). This provides such an effect that the writing surface is held down with the left hand.

Then, a position posture of the hand tip of the left hand which traces the plotting surface is calculated by forward kinematics arithmetic operation from the values of the joint angle sensors of the left arm (step S32).

Then, a trajectory of a target position posture, described in the motion data, of the hand tip of the right hand with which a character or a picture is plotted on the plotting surface with the pen with reference to the origin provided by the position of the left hand is calculated more accurately (step S33).

Then, a target position posture of the hand tip of the right hand based on the force control is determined (step S34). Further, a final instruction position posture on which the application rate a is reflected is determined (step S35).

Then, angle instruction values for the joint actuators of the right arm are calculated using inverse kinematics arithmetic operation from the final instruction position posture of the hand tip of the right hand (step S36). The angle instruction values for the joint actuators of the individual portions determined in this manner are outputted to the input/output device of the robot so that the joint actuators of the right arm of the robot perform motions based on the angle instruction values. Consequently, a motion of plotting a character or a picture on a plotting face positioned at an arbitrary place in the air can be implemented.

It is to be noted that, while it is described that a character or a picture is plotted on a plane, if the left hand detects a curved surface, then a similar robust plotting function can be implemented using a trajectory calculation method according to which the hand tip of the right hand is used along the curved surface. Further, such a function for cooperation of different members as just mentioned is not limited to a plotting function but is effective for many different motions. Further, also as regards the operation member, it is not limited to the right hand and the left hand, but arbitrary operation members of a robot can be made cooperate with each other.

While a preferred embodiment of the present invention has been described using specific terms, it is apparent that changes and variations may be made to the embodiment by those skilled in the art without departing from the spirit or scope of the following claims.

In the present specification, motion editing to which the embodiment of the present invention is applied is described above taking a case wherein a partner type robot represented by a humanoid uses hand tips by which a pen is held to plot a character or a picture. However, the subject matter of the embodiment of the present invention is not limited to this. In particular, the embodiment of the present invention can be utilized not only in plotting of a character or a picture but also for editing of motion data for implementing various motions by which a robot apparatus which includes a plurality of movable joints uses an operation member as an end effecter to provide an operation to a particular operation object. Further, the present invention can be utilized in motion editing for robot apparatus of various types which have an operation member even if the robot apparatus are not of the humanoid type.

In short, the embodiment of the present invention is disclosed for illustrative purposes only, and the contents of description of the present specification shall not be interpreted restrictively. The scope of the embodiment of the invention, therefore, is to be determined solely by the following claims.

What is claimed is:

1. A motion editing apparatus for editing motion data which define motions of a robot apparatus which includes an operation member having a plurality of movable joints and capable of providing an operation to a particular operation object, comprising:

hand-written inputting means configured to allow a user to hand-written input a character or a picture to be plotted by the robot apparatus;

plotting trajectory discrimination means configured to discriminate, from within a trajectory plotted through said hand-written inputting section, a first portion which is being plotted and a second portion other than the first portion;

hand-written input information display means configured to output the trajectory being hand-written inputted by the user on a screen;

three-dimensional trajectory design deriving means configured to derive a three-dimensional trajectory design based on the two-dimensional plotting information inputted through said hand-written inputting section and a result of the discrimination by said plotting trajectory discrimination section;

three-dimensional trajectory design display means configured to display the three-dimensional trajectory design derived by said three-dimensional trajectory design deriving section on a three-dimensional screen;

interaction means configured to re-arrange the three-dimensional trajectory design in a three-dimensional space, in which the robot apparatus works, in accordance with interactions of the user through said three-dimensional screen and designate an operation member by which plotting of a character or a picture is to be performed in accordance with the three-dimensional trajectory design;

instruction value conversion means configured to convert the re-arranged three-dimensional trajectory design into instruction values for joint actuators, which compose a designated operation member, for plotting using the designated operation member; and motion data outputting means configured to output the converted instruction values as motion data which define the three-dimensional trajectory design in accordance with which the robot apparatus implements the character or the picture hand-written inputted by the user in the three-dimensional space.

2. The motion editing apparatus according to claim 1, wherein said hand-written inputting section includes a mouse, and said plotting trajectory discrimination section discriminates that the trajectory within a period of time within which a mouse button is operated on is the first portion which is being plotted and the trajectory within another period of time within which the mouse button is not operated on is the second portion other than the first portion.

3. The motion editing apparatus according to claim 1, wherein said hand-written inputting section includes a tablet with a writing pressure detection function, and said plotting trajectory discrimination section discriminates that the trajectory within a period within which the writing pressure is higher than a predetermined value is the first portion which is being plotted and the trajectory within another period within which the writing pressure is equal to or lower than the predetermined value is the second portion other than the first portion.

4. The motion editing apparatus according to claim 1, wherein said hand-written input information display section displays the first portion of the trajectory which is being plotted by a solid line and displays the second portion of the trajectory other than the first portion by a line any other than the solid line.

5. The motion editing apparatus according to claim 1, wherein said three-dimensional trajectory design deriving section determines time series coordinate information on a two-dimensional xy plane in the three-dimensional trajectory design based on time series information of two-dimensional xy coordinates inputted from said hand-written inputting section and gives a z-axis coordinate value in the three-dimensional trajectory design depending upon whether or not the point on the two-dimensional plane corresponds to a point which is being plotted.

6. The motion editing apparatus according to claim 1, wherein said three-dimensional trajectory design deriving section derives a force control parameter to be used for force control when the robot apparatus is to plot a character or a picture through an inputting operation of said hand-writing inputting section by the user, and said motion data outputting section outputs the motion data with the force control parameter.

7. The motion editing apparatus according to claim 6, wherein said three-dimensional trajectory design deriving section determines the force control parameter based on a z-axis coordinate value in the three-dimensional trajectory design which is given depending upon whether or not plotting is proceeding.

8. The motion editing apparatus according to claim 6, wherein said hand-written inputting section includes a tablet with a plotting pressure detection function, and said three-dimensional trajectory design deriving section determines the force control parameter based on the writing pressure when the user plots a character or a picture on said tablet.

9. The motion editing apparatus according to claim 6, wherein said three-dimensional trajectory design deriving section determines, as the force control parameter, a target force in a z-axis direction to be applied to an xy plane as a plotting surface.

10. The motion editing apparatus according to claim 6, wherein said three-dimensional trajectory design deriving section determines, as the force control parameter, an application rate a representative of a ratio of target position posture information determined with the force control taken into consideration to a target position posture defined by the motion data.

11. The motion editing apparatus according to claim 1, further comprising a screen reproduction section configured to reproduce a manner in which the robot apparatus plots a character or a picture in accordance with the trajectory design of the instruction values converted by said instruction value conversion section on said three-dimensional screen.

12. The motion editing apparatus according to claim 1, further comprising a physical restriction confirmation section configured to confirm, when a character or a picture is plotted in accordance with the three-dimensional trajectory re-arranged in the three-dimensional space, whether or not a physical restriction to the robot apparatus or an arm of the robot apparatus is contrary.

13. A motion editing method for editing motion data which define motions of a robot apparatus which includes an end effecter having a plurality of movable joints and capable of providing an operation to a particular operation object, comprising the steps of:
  inputting a character or a picture hand-written inputted by a user;
  discriminating, from within a trajectory plotted at the hand-written inputting step, a first portion which is being plotted and a second portion other than the first portion;
  outputting the trajectory being hand-written inputted by the user on a screen;
  deriving a three-dimensional trajectory design based on the two-dimensional plotting information inputted at the hand-written inputting step and a result of the discrimination at the plotting trajectory discrimination step;
  displaying the three-dimensional trajectory design derived at the three-dimensional trajectory design deriving step on a three-dimensional screen;
  re-arranging the three-dimensional trajectory design in a three-dimensional space, in which the robot apparatus works, in accordance with interactions of the user through said three-dimensional screen and designate an operation member by which plotting of a character or a picture is to be performed in accordance with the three-dimensional trajectory design;
  converting the re-arranged three-dimensional trajectory design into instruction values for joint actuators, which compose a designated operation member, for plotting using the designated operation member; and
  outputting step of outputting the converted instruction values as motion data which define the three-dimensional trajectory design in accordance with which the robot apparatus implements the character or the picture hand-written inputted by the user in the three-dimensional space.

14. The motion editing method according to claim 13, wherein, at the hand-written inputting step, the user hand-written inputs a character or a picture using a mouse, and, at the plotting trajectory discrimination step, it is discriminated that the trajectory within a period of time within which a mouse button is operated on is the first portion which is being plotted and the trajectory within another period of time within which the mouse button is not operated on is the second portion other than the first portion.

15. The motion editing method according to claim 13, wherein, at the hand-written inputting step, the user uses a tablet with a writing pressure detection function to input a character or a picture, and, at the plotting trajectory discrimination step, it is discriminated that the trajectory within a period within which the writing pressure is higher than a predetermined value is the first portion which is being plotted and the trajectory within another period within which the writing pressure is equal to or lower than the predetermined value is the second portion other than the first portion.

16. The motion editing method according to claim 13, wherein, at the hand-written input information display step, the first portion of the trajectory which is being plotted is displayed by a solid line and the second portion of the trajectory other than the first portion is discriminated by a line any other than the solid line.

17. The motion editing method according to claim 13, wherein, at the three-dimensional trajectory design deriving step, time series coordinate information on a two-dimensional xy plane in the three-dimensional trajectory design is determined based on time series information of two-dimensional xy coordinates inputted from said hand-written inputting step and a z-axis coordinate value in the three-dimensional trajectory design is given depending upon whether or not the point on the two-dimensional plane corresponds to a point which is being plotted.

18. The motion editing method according to claim 13, wherein, at the three-dimensional trajectory design deriving step, a force control parameter to be used for force control when the robot apparatus is to plot a character or a picture is derived through an inputting operation of said hand-writing inputting step by the user, and, at the motion data outputting step, the motion data with the force control parameter are outputted.

19. The motion editing method according to claim 18, wherein, at the three-dimensional trajectory design deriving step, the force control parameter is determined based on a z-axis coordinate value in the three-dimensional trajectory design which is given depending upon whether or not plotting is proceeding.

20. The motion editing method according to claim 18, wherein, when the user uses a tablet with a plotting pressure detection function to input a character or a picture at the hand-written inputting step, and, at the three-dimensional trajectory design deriving step, the force control parameter is determined based on the writing pressure when the user plots a character or a picture on said tablet.

21. The motion editing method according to claim 18, wherein, at the three-dimensional trajectory design deriving step, as the force control parameter, a target force in a z-axis direction to be applied to an xy plane as a plotting surface is determined.

22. The motion editing method according to claim 18, wherein, at the three-dimensional trajectory design deriving step, as the force control parameter, an application rate a representative of a ratio of target position posture information determined with the force control taken into consideration to a target position posture defined by the motion data is determined.

23. The motion editing method according to claim 13, further comprising a screen reproduction step of reproducing a manner in which the robot apparatus plots a character or a picture in accordance with the trajectory design of the instruction values converted at the instruction value conversion step on said three-dimensional screen.

24. The motion editing method according to claim 13, further comprising a physical restriction confirmation step of confirming, when a character or a picture is plotted in accordance with the three-dimensional trajectory re-arranged in the three-dimensional space, whether or not a physical restriction to the robot apparatus or an arm of the robot apparatus is contrary.

25. A non-transitory program storage medium embedded with a computer program in computer-readable form so that a computer system that executes said program edits motion data which define motions of a robot apparatus which includes an operation member having a plurality of movable joints and capable of providing an operation to a particular operation object, said computer program causing said computer system to perform the method comprising the steps of:

inputting a character or a picture hand-written inputted by a user;

discriminating, from within a trajectory plotted at the hand-written inputting step, a first portion which is being plotted and a second portion other than the first portion;

outputting the trajectory being hand-written inputted by the user on a screen;

deriving a three-dimensional trajectory design based on the two-dimensional plotting information inputted at the hand-written inputting step and a result of the discrimination at the plotting trajectory discrimination step;

displaying the three-dimensional trajectory design derived at the three-dimensional trajectory design deriving step on a three-dimensional screen;

re-arranging the three-dimensional trajectory design in a three-dimensional space, in which the robot apparatus works, in accordance with interactions of the user through said three-dimensional screen and designate an operation member by which plotting of a character or a picture is to be performed in accordance with the three-dimensional trajectory design;

converting the re-arranged three-dimensional trajectory design into instruction values for joint actuators, which compose a designated operation member, for plotting using the designated operation member; and outputting the converted instruction values as motion data which define the three-dimensional trajectory design in accordance with which the robot apparatus implements the character or the picture hand-written inputted by the user in the three-dimensional space.

26. A motion editing apparatus for editing motion data which define motions of a robot apparatus which includes an operation member having a plurality of movable joints and capable of providing an operation to a particular operation object, comprising:

a hand-written inputting section configured to allow a user to hand-written input a character or a picture to be plotted by the robot apparatus;

a plotting trajectory discrimination section configured to discriminate, from within a trajectory plotted through said hand-written inputting section, a first portion which is being plotted and a second portion other than the first portion;

a hand-written input information display section configured to output the trajectory being hand-written inputted by the user on a screen;

a three-dimensional trajectory design deriving section configured to derive a three-dimensional trajectory design based on the two-dimensional plotting information inputted through said hand-written inputting section and a result of the discrimination by said plotting trajectory discrimination section;

a three-dimensional trajectory design display section configured to display the three-dimensional trajectory design derived by said three-dimensional trajectory design deriving section on a three-dimensional screen;

an interaction section configured to re-arrange the three-dimensional trajectory design in a three-dimensional space, in which the robot apparatus works, in accordance with interactions of the user through said three-dimensional screen and designate an operation member by which plotting of a character or a picture is to be performed in accordance with the three-dimensional trajectory design;

an instruction value conversion section configured to convert the re-arranged three-dimensional trajectory design into instruction values for joint actuators, which compose a designated operation member, for plotting using the designated operation member; and a motion data outputting section configured to output the converted instruction values as motion data which define the three-dimensional trajectory design in accordance with which the robot apparatus implements the character or the picture hand-written inputted by the user in the three-dimensional space.

* * * * *